US012712693B2

(12) United States Patent
Li et al.

(10) Patent No.: US 12,712,693 B2
(45) Date of Patent: Aug. 18, 2026

(54) METHOD FOR REQUESTING SYSTEM INFORMATION BLOCK, AND COMMUNICATION DEVICE

(71) Applicant: Beijing Xiaomi Mobile Software Co., Ltd., Beijing (CN)

(72) Inventors: Yanhua Li, Beijing (CN); Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 575 days.

(21) Appl. No.: 18/037,614

(22) PCT Filed: Nov. 19, 2020

(86) PCT No.: PCT/CN2020/130213
§ 371 (c)(1),
(2) Date: Nov. 14, 2023

(87) PCT Pub. No.: WO2022/104662
PCT Pub. Date: May 27, 2022

(65) Prior Publication Data
US 2024/0129095 A1 Apr. 18, 2024

(51) Int. Cl.

| | |
|---|---|
| ***H04L 5/00*** | (2006.01) |
| ***H04W 74/0833*** | (2024.01) |
| ***H04W 76/20*** | (2018.01) |
| *H04W 80/02* | (2009.01) |

(52) U.S. Cl.
CPC ....... *H04L 5/0053* (2013.01); *H04W 74/0833* (2013.01); *H04W 76/20* (2018.02); *H04W 80/02* (2013.01)

(58) Field of Classification Search
CPC ... H04L 1/1607; H04L 5/0053; H04L 5/0055; H04W 24/02; H04W 48/10; H04W 48/12; H04W 48/14; H04W 52/0225; H04W 74/004; H04W 74/0833; H04W 76/20; H04W 80/02; Y02D 30/70
See application file for complete search history.

(56) References Cited

U.S. PATENT DOCUMENTS

| | | | | |
|---|---|---|---|---|
| 10,548,065 | B2 * | 1/2020 | Basu Mallick | H04W 48/10 |
| 11,064,528 | B2 * | 7/2021 | Jang | H04W 74/0833 |
| 11,178,639 | B2 * | 11/2021 | Peisa | H04W 74/0833 |
| 11,191,007 | B2 * | 11/2021 | Pan | H04W 8/005 |
| 11,395,347 | B2 * | 7/2022 | Tao | H04W 74/0833 |

(Continued)

FOREIGN PATENT DOCUMENTS

| | | |
|---|---|---|
| CN | 101640901 A | 2/2010 |
| CN | 108024380 A | 5/2018 |

(Continued)

OTHER PUBLICATIONS

Huawei et al. , "R2-1817659 , Correction on SI message acquisition timing", 3GPP TSG-RAN WG2 Meeting #104, Nov. 2, 2018 (Nov. 2, 2018) , Section 5.2.2.3.3; Type-X.

(Continued)

*Primary Examiner* — Frank Duong
(74) *Attorney, Agent, or Firm* — Volpe Koenig

(57) ABSTRACT

A method for requesting a system information block (SIB) may include: receiving an acquisition request requesting the SIB; and issuing feedback information for the acquisition request.

25 Claims, 7 Drawing Sheets

(56) References Cited

U.S. PATENT DOCUMENTS

| | | | | |
|---|---|---|---|---|
| 12,114,307 | B2 * | 10/2024 | Mu | H04W 48/12 |
| 2018/0317263 | A1 * | 11/2018 | Ishii | H04W 74/0833 |
| 2018/0343572 | A1 | 11/2018 | Basu Mallick et al. | |
| 2020/0322878 | A1 * | 10/2020 | Prabhakar | H04W 48/12 |

FOREIGN PATENT DOCUMENTS

| | | | |
|---|---|---|---|
| CN | 109089225 | A | 12/2018 |
| CN | 110291740 | A | 9/2019 |
| WO | 2017/196146 | A1 | 11/2017 |

OTHER PUBLICATIONS

CATT, "R1-1712354, Delivery of Other System Information", 3GPP TSG RAN WG1 Meeting#90, Aug. 25, 2017 (Aug. 25, 2017) , Section 1-2; Type-X.

* cited by examiner

E/T/R/R/BI Subheader
E/T/RAPID Subheader
E/T/NACK RAPID
Second type of MAC RAR
MAC sub-PDU 1 (BI )
MAC sub-PDU 2 (RAPID )
MAC sub-PDU 3 (RAPID and RAR)
...
MAC sub-PDU n
Padding (Optionally)

METHOD FOR REQUESTING SYSTEM INFORMATION BLOCK, AND COMMUNICATION DEVICE

CROSS-REFERENCE TO RELATED APPLICATION

The present application is the U.S. National Stage Application of International Application No. PCT/CN2020/130213, filed on Nov. 19, 2020, the entire content of which is incorporated herein by reference for all purposes.

BACKGROUND

A base station may send system information through broadcasting. The system information includes: a master information block (MIB) and a system information block (SIB). The SIB is also divided into SIB1 and other SIBs. The other SIBs may include: SIB2, SIB3, SIB4, and the like. The MIB carries the most needed information required for a user equipment (UE) to access a cell.

For example, the MIB includes information such as a system frame number and/or a subcarrier spacing.

The SIB1 carries scheduling information, access control information, and cell selection information of the other SIBs.

The other SIBs carry parameters required for other functions, such as cell reselection, positioning, emergency notification, and sidelink (SL). The UE needs to acquire the MIB and the SIB1 constantly. For the other SIBs, the UE selects information from them for reading based on its own requirements.

SUMMARY

The disclosure relates to, but is not limited to, the technical field of wireless communication, in particular to a method for requesting a system information block, and a communication device.

A first aspect of an example of the disclosure provides a method for requesting a system information block, including: receiving an acquisition request for requesting the system information block (SIB); and issuing feedback information for the acquisition request.

A second aspect of an example of the disclosure provides a method for requesting a system information block, including: sending an acquisition request for requesting the system information block (SIB); and receiving feedback information for the acquisition request.

A third aspect of an example of the disclosure provides a communication device, including: a processor; a transceiver; and a memory; where an executable program is stored in the memory and is capable of being executed by the processor, and the processor, when executing the executable program, performs the method for requesting the system information block as provided by the first aspect.

A fourth aspect of an example of the disclosure provides a communication device, including: a processor; a transceiver; and a memory; where an executable program is stored in the memory and is capable of being executed by the processor, and the processor, when executing the executable program, performs the method for requesting the system information block as provided by the second aspect.

It is to be understood that the above general descriptions and later detailed descriptions are examples and illustrative, and cannot limit the examples of the disclosure.

BRIEF DESCRIPTION OF THE DRAWINGS

The accompanying drawings here are incorporated into the specification and constitute a part of the specification, showing the principles consistent with the examples of the disclosure and used together with the specification to explain the examples of the disclosure.

DETAILED DESCRIPTION

When the system information changes, the base station may send a short message. The short message may carry a system information modification notification to notify the UE of changes in the system information. After receiving the short message, the UE may read and obtain updated system information.

The short message may further carry an emergency information notification, and if the UE supports acquiring emergency information, the UE may read SIB6, SIB7, and SIB8 to acquire the contents of the emergency information after receiving the notification.

Examples will be described in detail here, instances of which are shown in the accompanying drawings. When the following description refers to the accompanying drawings, unless otherwise indicated, the same numbers in different accompanying drawings indicate the same or similar elements. The implementations described in the following examples do not represent all implementations consistent with the examples of the disclosure. Rather, they are instances of apparatuses and methods consistent with some aspects of the examples of the disclosure as detailed in the appended claims.

The terms used in the examples of the disclosure are for the purpose of describing specific examples, and are not intended to limit the examples of the disclosure. The singular forms "one", "a", and "the" used in the examples of the disclosure and the appended claims are also intended to include the plural forms unless the context clearly indicates other meanings. It also needs to be understood that the term "and/or" as used here refers to and includes any or all possible combinations of one or more associated listed items.

It needs to be understood that although the terms first, second, third, etc. may be used to describe various pieces of information in the examples of the disclosure, such information is not limited to these terms. These terms are used to distinguish the same type of information from each other. For example, without departing from the scope of the examples of the disclosure, first information may also be referred to as second information, and similarly, the second information may also be referred to as the first information. Depending on the context, the word "if" as used here can be interpreted as "at the time" or "when" or "in response to determining".

Figure 1:
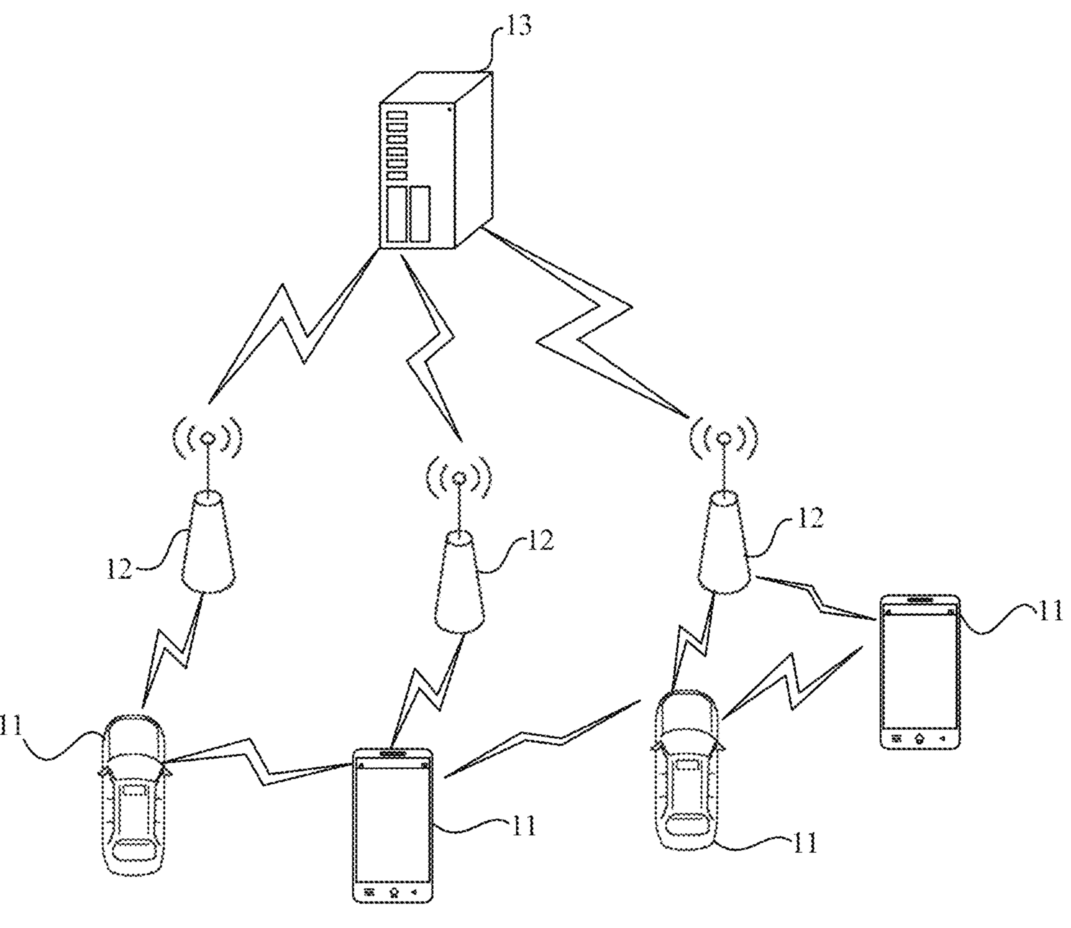
FIG. 1 is a schematic structural diagram of a wireless communication system illustrated according to an example.

Please refer to FIG. 1, FIG. 1 illustrates a schematic structural diagram of a wireless communication system provided by an example of the disclosure. As shown in FIG. 1, the wireless communication system is a communication system based on a cellular mobile communication technology. The wireless communication system may include: a plurality of user equipments (UEs) 11 and a plurality of base stations 12.

The UE 11 may refer to devices that provide a user with voice and/or data connectivity. The UE 11 may communicate with one or more core networks via a radio access network (RAN). The UE 11 may be an Internet of Things UE, such as a sensor device, a mobile phone (or called a "cellular" phone), or a computer with the Internet of Things UE. For example, UE 11 may be a fixed, portable, pocket-size, handheld, computer-built-in, or vehicle-mounted apparatus. For example, it may be a station (STA), a subscriber unit, a subscriber station, a mobile station, a mobile, a remote station, an access point, a remote terminal, an access terminal, a user terminal, a user agent, or a user device. The UE 11 may also be a device for unmanned aircraft. The UE 11 may also be a vehicle-mounted device, such as a trip computer with a wireless communication function, or a wireless communication device connected to an external trip computer. The UE 11 may also be a roadside device, such as a street lamp, a signal light, or another roadside device with wireless communication functions.

The base stations 12 may be network-side devices in the wireless communication system. The wireless communication system may be a 4th-generation mobile communication (4G) system, also called a long-term evolution (LTE) system; the wireless communication system may also be a 5G system, also called a new radio (NR) system or 5G NR system. The wireless communication system may also be a next-generation system to the 5G system. An access network in the 5G system may be called a new generation radio access network (NG-RAN) or an MTC system.

The base stations 12 may be evolved Node Bs (eNBs) adopted in the 4G system. The base stations 12 may also be base stations (gNBs) adopting a centralized-distributed architecture in the 5G system. When the base stations 12 adopt the centralized-distributed architecture, each typically includes a central unit (CU) and at least two distributed units (DUs). Protocol stacks of a packet data convergence protocol (PDCP) layer, a radio link control (RLC) layer, and a media access control (MAC) layer are disposed in the central unit. Protocol stacks of the physical (PHY) layers are disposed in the distributed units, and specific implementations of the base stations 12 are not limited to the examples of the disclosure.

The base stations 12 and the UE 11 may establish a wireless connection via a wireless air interface. In different implementations, the wireless air interface is a wireless air interface based on the 4th generation mobile communication network technology (4G) standard; or the wireless air interface is a wireless air interface based on the 5th generation mobile communication network technology (5G) standard, such as new radio; or the wireless air interface may also be a wireless air interface based on the next-generation mobile communication network technology standard of 5G.

In some examples, an end-to-end (E2E) connection may also be established between the UEs 11, for example, vehicle-to-vehicle (V2V) communication, vehicle-to-infrastructure (V2I) communication, vehicle-to-pedestrian (V2P) communication, and other scenarios in vehicle-to-everything (V2X) communication.

In some examples, the above wireless communication system may further include a network management device 13.

The plurality of base stations 12 are respectively connected with the network management device 13. The network management device 13 may be a core network device in the wireless communication system. For example, the network management device 13 may be a mobility management entity (MME) in an evolved packet core (EPC). The network management device may also be another core network device, such as a serving gateway (SGW), a public data network gateway (PGW), a policy and charging rules function (PCRF), or a home subscriber server (HSS). The implementation form of the network management device 13 is not limited to the example of the disclosure.

Figure 2:
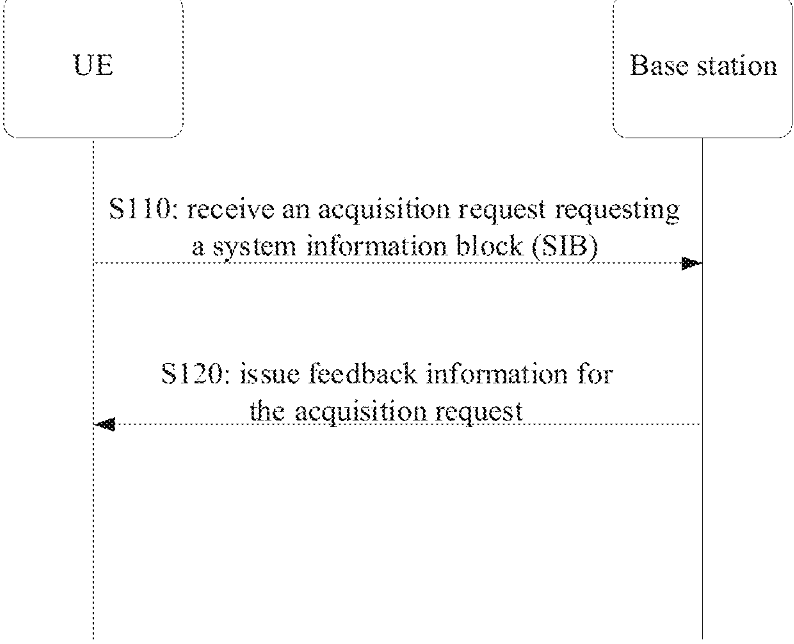
FIG. 2 is a schematic flowchart of a method for requesting a system information block illustrated according to an example.

As shown in FIG. 2, an example of the disclosure provides a method for requesting a system information block, including S110 and S120.

In S110, an acquisition request for requesting the system information block (SIB) is received.

In S120, feedback information for the acquisition request is issued.

The method may be performed by a base station on a network side. The base station may be various base stations, such as an evolved Node B (eNB), or a next generation Node B (gNB).

The acquisition request for requesting the SIB, sent by the UE, is received. The acquisition request includes, but is not limited to, an on-demand request.

In the example of the disclosure, after receiving the acquisition request, the feedback information may be sent to the UE. The feedback information may include: an acknowledgement indicating that the requested SIB is confirmed to be issued and/or a negative acknowledgement indicating that the requested SIB is refused to be sent.

By issuing the feedback information, the UE knows whether the network side will issue its requested SIB, rather than simply defaulting to the network side issuing all its requested SIBs, or continuously sending the acquisition request for requesting the corresponding SIB when not receiving the requested SIB. Additionally, the power consumption caused by continuous waiting and/or request sending of the UE due to the inability to receive feedback from the network side for the acquisition request is reduced.

In some examples, SIB1 is a system information block that is separately sent and is not sent coupled with other SIBs. The SIB is an SIBx acquired in an on-demand form, and x is a positive integer equal to or greater than 2. The SIBx here includes, but is not limited to, SIB2, SIB3, SIB4, SIB5, SIB6, SIB7, SIB8, SIB9, or the like. This is an example of the SIB requested by the acquisition request, which is not limited to the above examples during specific implementation.

In some examples, the SIB targeted by the feedback information may be carried to provide an SIB for the UE in a non-connected state. The UE in the non-connected state includes, but is not limited to, UE in an idle state and/or UE in an inactive state.

It may be understood that the SIBx is an SIB carrying configuration information of a tracking reference signal (TRS), and/or an SIB carrying configuration information of a channel state indicator (CSI)-reference signal (RS).

The configuration information includes, but is not limited to, resource information of a transmission resource. The transmission resource includes, but is not limited to, a frequency domain resource, a time domain resource, and/or a beam resource.

It may be understood that the configuration information may include: indication information for sending a pattern of the TRS, and/or indication information for sending a pattern of the CSI-RS. The pattern may be a pattern of the frequency domain resource, and/or a pattern of the time domain resource.

The TRS may be used for the UE to perform phase noise estimation.

The CSI-RS may be used for the UE to perform channel quality estimation on a current wireless channel.

In some examples, S120 may include: issuing a negative acknowledgement (NACK), where the NACK indicates that the network side does not issue the requested SIB; or issuing an acknowledgement (ACK), where the ACK indicates that the network side issues the requested SIB.

The feedback information in the example of the disclosure may be the NACK. For example, if the UE does not receive the carried feedback information, it may be considered as the ACK given by the network side. According to statistical data, the probability of issuing the NACK by the network side is lower than that of issuing the ACK. In order to reduce signaling overhead, more related arts are used. The feedback information provided in the example of the disclosure may be the NACK. If the NACK is issued, it is indicated that the network side may not send the SIB requested by the UE.

If the network side issues the ACK, it is indicated that the network side will issue the SIB corresponding to the acquisition request, and the UE may receive the requested SIB at a position of the transmission resource of the corresponding SIB, without continuously sending the acquisition request to repeatedly request the issuance of the SIB.

In one example, S120 may include at least one of: issuing the NACK in a case where a resource indicated by the configuration information carried in the requested SIB is not configured; issuing the NACK in a case where the resource indicated by the configuration information carried in the requested SIB is configured, and the resource indicated by the configuration information is unavailable; and issuing the NACK in a case where scheduling information of the requested SIB is in remained minimum system information (RMSI).

For example, when determining whether the transmission resource of the SIB needs to be configured, the base station finds that there is less or no UE in the non-connected state in a cell, and communication resources may be saved, so that more communication resources are used for sending other information. In this case, there may be no configured transmission resources for the TRS and/or the CSI-RS, which is equivalent to the non-existence of part of the SIBs acquired on-demand. In such a scenario, the base station naturally issues the NACK.

For another example, although the base station configures the transmission resource for the corresponding reference signal and/or control information, due to emergency business data and other situations, the configured transmission resource has been occupied or crowded out by other control information and/or business data with a higher transmission priority. Thus, the network side does not have the transmission resource to issue the corresponding reference signal and/or control information, SIBs carrying the configuration information of the reference signal and/or control information also do not exist, and the base station side similarly may send the NACK to inform the UE not to wait for the requested SIB or repeatedly request the corresponding SIB.

Here, in response to that, the resource indicated by the configuration information carried in the requested SIB is configured, and the resource indicated by the configuration information is unavailable, which may be considered as: the resource indicated by the configuration information carried in the SIB does not send the reference signal and/or control information corresponding to the configuration information.

In another example, if the base station side has issued the configuration information carried in the corresponding SIB, the base station side may consider that there is no need to repeat sending, and may similarly send the NACK.

For example, the configuration information carried in the requested SIB has been carried in the remained minimum system information (RMSI), and then the base station may issue the NACK. In this way, the UE receives the NACK, and then may extract information contents that need to be carried in the requested SIB from the RMSI. In some cases, if the UE does not receive the corresponding RMSI, the UE may request UE at an adjacent position to acquire the RMSI.

In some examples, the feedback information further includes auxiliary information, where the auxiliary information is at least used for the UE to determine relevant information required for acquiring the SIB.

That is, in this case, the feedback information not only includes a feedback indication, but also includes the auxiliary information. The feedback indication here is the above NACK or ACK.

The auxiliary information may be used for the UE to acquire the relevant information of the requested SIB, for example, the auxiliary information is used for indicating when the UE can initiate the acquisition request for requesting the SIB again, and/or indicating whether a configuration resource corresponding to the configuration information carried in the requested SIB is available.

By issuing the auxiliary information, the UE knows whether the acquisition request is initiated again and when the acquisition request is issued.

In some other examples, the auxiliary information may further carry information of a reason why the NACK is carried in the feedback information. For example, the UE requests the SIB carrying the configuration information of the TRS/CSI-RS, when the base station finds that the transmission resource of the TRS/CSI-RS is not configured currently, or the configured transmission resource is in an unavailable state such as being crowded out, it is useless to issue the requested SIB, the base station may feed back the NACK and inform the reason for sending the NACK at the same time, and the UE can know the reason for the base station sending the NACK based on the reason, so as not to repeatedly initiate the acquisition request or continuously wait.

In one example, the auxiliary information includes at least one of: duration information, where the duration information indicates an interval duration for the UE to initiate the acquisition request again; and availability state information, where the availability state information indicates whether the configuration information carried in the SIB requested by the acquisition request exists, or indicates whether the resource indicated by the configuration information carried in the SIB requested by the acquisition request is available.

By setting the interval duration, the frequency of the UE initiating the acquisition request is reduced, and the phenomenon of wireless environment degradation caused by frequent initiation of the acquisition request is reduced.

There are at least two reasons why the requested SIB need not be issued. One is that the network side is not configured with the configuration information contained in the corresponding requested SIB. In other words, the transmission resource of the reference signal is not configured for the corresponding reference signal and/or control information. Two, the network side is configured with the configuration information contained in the requested SIB; however, the configuration information is in an invalid state currently. In other words, the transmission resource indicated by the configuration information is in an unavailability state that is crowded out by other control information and/or business data.

In some examples, the acquisition request is sent by the UE in the non-connected state. At this time, the base station receives the acquisition request in a random access process. For example, S110 includes, but is not limited to, the acquisition request being received in a first message (Msg1) or a third message (Msg3) in the random access process. Here, the UE in the non-connected state includes: the UE in the idle state and/or the UE in the inactive state.

Figures 3, 4:
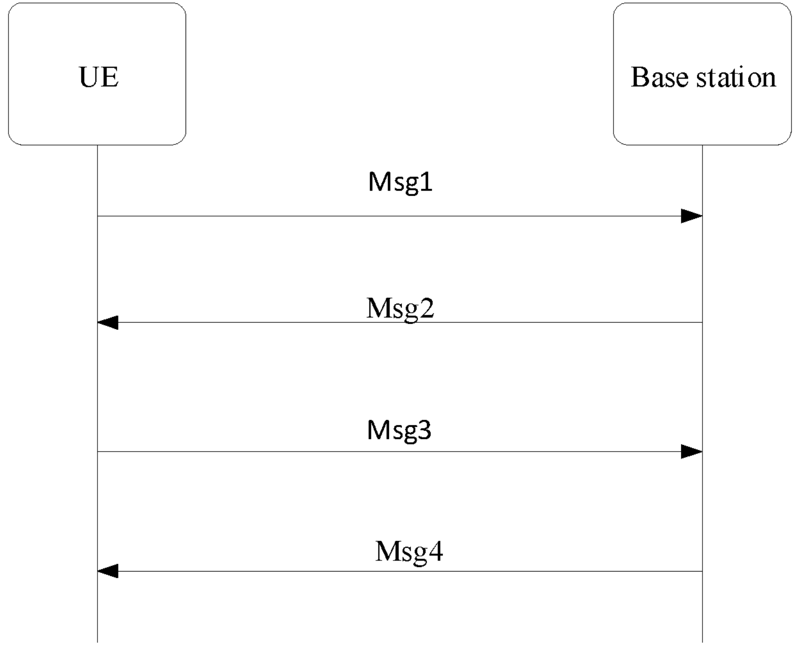
FIG. 3 is a schematic flowchart of a random access process illustrated according to an example.
FIG. 4 is a schematic format diagram of a MAC PDU illustrated according to an example.

FIG. 3 shows a schematic flowchart of a 4-step random access process, and in the 4-step random access process.

First, the UE sends a Msg1 to a base station; the Msg1 carries a random access preamble (RAP) identifier (ID) for the UE to request random access. If the base station selects the UE for random access, a Msg2 may be issued, and the Msg2 carries the RAP ID reported by the UE. After receiving the Msg2 carrying the PRA ID itself, the UE may send a Msg3 to the base station. After receiving the Msg3, the base station may issue a Msg4, and the Msg4 is composed of a MAC protocol data unit (PDU).

The Msg1 may be understood as a random access request carrying the random access preamble in the random access process. The Msg3 may be understood as a message sent by the UE after receiving the issued Msg2 based on the Msg1. The Msg2 may contain a random access response (RAR).

In some other examples, the method further includes receiving the acquisition request carried in a paging response sent via a paging message.

If the acquisition request is carried in the Msg1, the feedback information may be carried in the Msg2 and/or the Msg4. In order to enable the UE to obtain the feedback information as soon as possible, the feedback information is carried in the Msg2. The Msg2 may carry one or more feedback bits indicating the feedback information.

For example, the one or more bits in the Msg2 indicate the feedback information. A bit has two bit values, respectively being "0" and "1".

In one case, the bit value of the feedback bit being "0" represents that the network side indicates the acknowledgement, and then the bit value being "1" represents the negative acknowledgement. In another case, the bit value of the feedback bit being "1" represents that the network side indicates the acknowledgement, and then the bit value being "0" represents that the network side indicates the negative acknowledgement.

In one example, the feedback bit may be composed of a reserved bit in the message format of the Msg2, and may also be composed of an extended bit in the message format of the Msg2. Here, the extended bit may be a newly added bit.

The MAC PDU corresponding to the Msg2 at least carries a MAC sub-PDU. In some scenarios, the MAC PDU not only includes the MAC sub-PDU but also includes padding. The padding is an optional content of the MAC PDU in the Msg2.

Referring to FIG. 4, a MAC sub-PDU may at least include a subheader. A MAC sub-PDU not only includes a subheader but may also include a corresponding MAC RAR. The MAC sub-PDU carries the RAP ID. If the RAP ID is sent by a certain UE, it represents that the MAC RAR associated with the MAC sub-PDU is sent to the UE, and the UE may send a third message based on the MAC RAR.

The feedback information in the example of the disclosure may be carried in the MAC RAR. For example, the feedback bit may be carried in the MAC RAR.

A third MAC sub-PDU in the MAC PDU shown in FIG. 4 is the MAC sub-PDU carrying the feedback information. FIG. 4 takes the feedback information being the NACK as an example, and there is an RAP ID subheader and a second type of MAC RAR in the third MAC sub-PDU.

According to whether the MAC RAR carries the feedback information, the MAC RAR may be divided into a first type of MAC RAR and a second type of MAC RAR. The first type of MAC RAR does not carry the feedback information, and the second type of MAC RAR carries the feedback information. The information carried in the first type of MAC RAR may include: various pieces of transmitted authorization information, such as authorization information of a physical uplink shared channel.

In the example of the disclosure, the feedback information is carried in the second type of MAC RAR, the corresponding UE receives the Msg2, and according to a technology matched based on the RAP ID in the random access process of the related art, the UE matching the RAP ID is that after sending it to itself, the UE may continue to decode the second type of MAC RAR to acquire the feedback information, and acquires the ACK or NACK indication of the base station from the feedback information. Afterwards, the UE decides the subsequent random access process, or whether to continue to request the SIB or wait for receiving the SIB. For example, if the NACK is received, the random access process is terminated, such as not continuing to send the Msg3. For example, the received RAP ID carried in the Msg2 is different from the RAP ID sent by the UE in the Msg1, and then the UE terminates the random access process.

In some examples, since the feedback information is introduced into the Msg2, the Msg2 may be divided into two types according to whether the feedback information can be carried.

A type of Msg2 continues to use the information format not carrying the feedback information, and the Msg2 with this information format forms a first type of Msg2; and the other type of Msg2 uses the information format carrying the feedback information, and the Msg2 with this information format is a second type of Msg2.

The Msg2 provided in the example of the disclosure may be divided into: the Msg2 that cannot carry the feedback information being the first type of Msg2, and the Msg2 that can carry the feedback information being the second type of Msg2.

In one example, a communication resource of the Msg1 corresponding to the first type of Msg2 is different from a communication resource of the Msg1 corresponding to the second type of Msg2.

The communication resources of the Msg1 corresponding to the first type of Msg2 and the second type of Msg2 are different, and then a base station side may determine which type of Msg2 to reply to the UE according to the communication resource used by the Msg1 and sent by the UE.

In some examples, the communication resource of the Msg1 corresponding to the second type of Msg2 may be invisible to a UE that does not support the second type of Msg2. For example, the communication resource of the Msg1 corresponding to the second type of Msg2 may be a configuration of a non-critical extension.

The configuration of the non-critical extension is an optional configuration. During configuration, the network side may select the configuration of the non-critical extension or not. If the network side does not select the configuration of the non-critical extension, the network side is not configured with the second type of Msg2 to issue the feedback information.

In one example, since the communication resources of the Msg1 of the first type of Msg2 and the second type of Msg2 which are issued by the base station are different, at this time, according to the received communication resource of the Msg1, the base station may simply determine whether the Msg1 carries the acquisition request, and which information format needs to be used to decode the received Msg1. Thereby simplifying the decoding of the Msg1 by the base station side.

In some examples, the Msg1 carrying the acquisition request and the Msg1 not carrying the acquisition request may multiplex the same communication resource, after receiving the Msg1, the base station side decodes the Msg1 respectively in the information formats of the Msg1 carrying the acquisition request and the Msg1 not carrying the acquisition request, for example, the current type of the Msg1 may be distinguished by its carried random access preamble ID.

In one example, the method further includes: an SIB1 is issued, where the SIB1 carries resource information of the communication resource of the Msg1 corresponding to the second type of Msg2.

In the example of the disclosure, the communication resource of the Msg1 is carried in the SIB1 sent by broadcasting, and in this way, even the UE in the non-connected state can also receive the resource information of the communication resource of the above Msg1.

The ways in which the Msg2 carries the feedback information include: explicit carrying, indicating the feedback information through a specific feedback bit; and implicit carrying, indicating the feedback information by sharing an indication bit with other information. For example, the feedback information has a corresponding relationship with specific information, and when the corresponding indication bit carries the specific information, it is equivalent to simultaneously indicating the corresponding specific information and the feedback information.

The specific information includes, but is not limited to, a random access preamble (RAP) ID.

The RAP ID may be divided into at least two kinds: one is an RAP ID that establishes a corresponding relationship with the feedback information, and the other is an RAP ID that does not establish a corresponding relationship with the feedback information.

For example, the RAP ID that establishes the corresponding relationship with the feedback information is established, then after receiving the RAP ID, the UE may know the feedback information of the network side for the SIB requested by the UE, and then determines to perform the operation of a next step according to the feedback information, such as whether to continue to send the acquisition request or whether it needs to receive the SIB on the corresponding resource.

The RAP ID that establishes the corresponding relationship with the feedback information may be an RAP ID reserved in the related art. Here, the reserved RAP ID may be notified to the UE in advance by the network side or specified by a communication protocol.

In the example of the disclosure, the RAP ID corresponding to the feedback information at least includes: an RAP ID corresponding to the NACK. That is, the Msg2 at least may carry an RAP ID that has a corresponding relationship with the NACK.

In some examples, in order to facilitate decoding of the UE, the second type of Msg2 further has a type field, and the type field indicates the type of the Msg2.

In some examples, the first type of Msg2 and the second type of Msg2 do not need to be distinguished via a specific type field. It may be understood that the first type of Msg2 and the second type of Msg2 are distinguished via the type of the field carried in the Msg2; and/or the first type of Msg2 and the second type of Msg2 are distinguished via the information contents carried in the Msg2. For example, the first type of Msg2 carries a first type of MAC RAR, and the second type of Msg2 carries a second type of MAC RAR. For another example, the second type of Msg2 carries the RAP ID that has the corresponding relationship with the feedback information, and the first type of Msg2 carries the RAP ID that does not have the corresponding relationship with the feedback information.

The type field includes one or more bits; the type field may also be called a type flag, and may be used for indicating whether the current Msg2 is the second type of Msg2, or directly indicating that the current Msg2 is the first type of Msg2 or the second type of Msg2. The current Msg2 may be a Msg2 containing the type field.

The RAP ID that has the corresponding relationship with the feedback information and is carried in the Msg2 has at least one of the following characteristics: different RAP IDs have corresponding relationships with the feedback information of different SIBs; and an RAP ID has a corresponding relationship with the feedback information of a plurality of SIBs.

In response to that an RAP ID has the corresponding relationship with the feedback information of the plurality of SIBs, the Msg2 further carries an information identifier of the SIB corresponding to the feedback information.

That is, in the corresponding relationship: the RAP IDs corresponding to the feedback information of different SIBs are different; or the feedback information of the different SIBs corresponds to the same RAP ID, and the Msg2 carries the information identifier of the SIB indicated by the feedback information.

The RAP IDs corresponding to the feedback information of the different SIBs are different, at least including: RAP IDs corresponding to the NACK of the different SIBs are different.

The feedback information of the different SIBs corresponding to the same RAP ID at least includes: the NACK of the different SIBs corresponds to the same RAP ID.

According to the different contents carried in the second type of Msg2, it may be divided into the following cases. Case 1: the second type of Msg2 carries the RAP ID that has the corresponding relationship with the feedback information, and does not carry auxiliary information and/or the information identifier of the SIB corresponding to the feedback information. Case 2: the second type of Msg2 carries the RAP ID that has the corresponding relationship with the feedback information of an SIB. Further, in this case, the second type of Msg2 may further carry one or more pieces of the above auxiliary information. Case 3: the second type of Msg2 carries the RAP ID that has the corresponding relationship with the feedback information of a plurality of SIBs, and an information identifier of the SIB corresponding to the RAP ID. Further, in this case, the second type of Msg2 may further carry one or more pieces of the above auxiliary information.

In both case 1 and case 2, the RAP IDs carried in the second type of Msg2 may all correspond to the feedback information of an SIB, and in this way, after receiving the corresponding RAP ID, the UE may know the feedback information of the corresponding SIB.

In case 3, after receiving the RAP ID, which simultaneously corresponds to the feedback information of a plurality of SIBs, the UE may further determine which SIB the RAP ID acts on according to the information identifier.

By adopting the method of case 3, the number of RAP IDs that have a corresponding relationship with the feedback information of the SIB may be relatively small. For example, it may be one, two, or a small number. If there are a plurality of RAP IDs that have the corresponding relationship with the feedback information of the plurality of SIBs, different RAP IDs may correspond to the feedback information of different SIBs. In this way, information bits carrying the identification information in the second type of Msg2 may be reduced correspondingly.

In one example, according to the corresponding relationship between the RAP ID and the feedback information of the SIB, and whether the Msg2 carrying the feedback information carries the auxiliary information, it may be divided into the following four cases.

Case 1: different RAP IDs carried in the Msg2 correspond to the feedback information of different SIBs, and the Msg2 does not have a MAC RAR carrying the auxiliary information.

Case 2: the same RAP ID carried in the Msg2 corresponds to the feedback information of the different SIBs, and the Msg2 does not have the MAC RAR carrying the auxiliary information.

Case 3: different RAP IDs carried in the Msg2 correspond to the feedback information of the different SIBs, and the Msg2 has the MAC RAR carrying the auxiliary information.

Case 4: the same RAP ID carried in the Msg2 corresponds to the feedback information of the different SIBs, and the Msg2 has the MAC RAR carrying the auxiliary information.

In one example, the Msg2 further carries an information identifier of the SIB having the feedback information. The information identifier may be carried when an RAP ID corresponds to the feedback information of an SIB, or when an RAP ID corresponds to the feedback information of a plurality of SIBs, and for the consideration of reducing bit overhead, the information identifier may be carried merely when an RAP ID corresponds to the feedback information of the plurality of SIBs.

In one example, the information identifier may be indicated explicitly via a dedicated bit or implicitly indicated by establishing a corresponding relationship with other information. When the information identifier is indicated explicitly through the dedicated bit, the information identifier is carried in an identification information field of the Msg2; the identification information field carries one or more information identifiers of the SIB corresponding to the NACK; or the identification information field carries one or more information identifiers of the SIB corresponding to the ACK.

The identification information field is introduced into the second type of Msg2, and the identification information field may be specifically used to place the information identifiers of the SIB whose feedback information has the corresponding relationship with the RAP ID. The identification information field may further be used for carrying the above auxiliary information.

The identification information field is contained in the MAC RAR of the Msg2, and a length of a MAC RAR is greater than or equal to a length of the identification information field.

For example, a protocol data unit (PDU) of a Msg2 may include a plurality of MAC sub-PDUs, and a MAC sub-PDU includes an RAP ID subheader and a MAC random access response (RAR). The RAP ID subheader is used for carrying the RAP ID, and the MAC RAR is used for carrying the random access response.

In the example of the disclosure, the identification information field may be contained in the MAC RAR, and the length of the identification information field is smaller than or equal to the length of the identification information field. In this way, it may be compatible with the MAC sub-PDU format in the related art. If the length of the identification information field is just equal to the length of the MAC RAR, the MAC RAR does not have a remaining bit, and at this time, the format at the MAC RAR level does not change. If the length of the identification information field is smaller than the length of the MAC RAR, the MAC RAR has the remaining bit; the remaining bit may be used as a reserved bit or carry other information. In this way, the format at the MAC RAR level changes.

Specifically, the length of the identification information field is smaller than or equal to the length of the MAC RAR, which may be selected according to the needs of current wireless transmission.

In another example, the length of the identification information field may exceed the length of the MAC RAR. For example, if the length of the identification information field exceeds the length of a MAC RAR, a MAC sub-PDU has an extended bit, and the identification information field simultaneously contains an information bit of the MAC RAR and the extended bit. Here, the extended bit is a newly added bit in a MAC sub-PDU.

In some examples, if the Msg2 carries the auxiliary information, and the Msg2 is provided with the identification information field, the identification information field is further used for carrying the auxiliary information; and the auxiliary information is at least used for the user equipment (UE) to determine relevant information required for acquiring the SIB. The related description of the auxiliary information may refer to the aforementioned corresponding examples, which will not be repeated here.

It needs to be noted that the auxiliary information carried in the Msg2 may be carried within or outside the identification information field.

Figure 5:
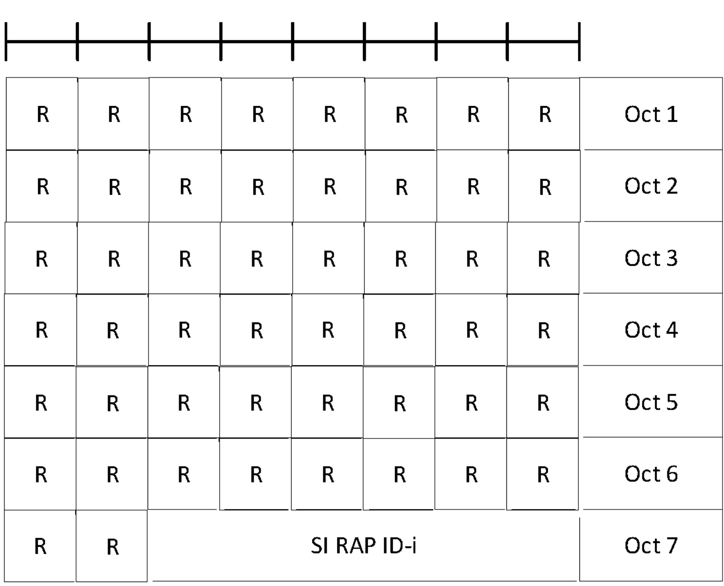
FIG. 5 is a schematic format diagram of a MAC RAR illustrated according to an example.

FIG. 5 shows a format example of a second type of MAC RAR provided by an example of the disclosure.

The second type of MAC RAR may include a plurality of bytes, and in FIG. 5, a second type of MAC RAR contains 7 octets, respectively being oct1 to oct7. The second type of MAC RAR shown in FIG. 5 has an SI RAP ID-i field, and the SI RAP ID-i field may be used at least for carrying the information identifier of the SIB corresponding to the above feedback information. In some examples, the SI RAP ID-i field may further be used for carrying the auxiliary information.

The Msg2 has a BI subheader of a backoff indicator (BI), and the BI subheader carries the feedback information.

The MAC sub-PDU of the Msg2 further carries the BI. The BI indicates a backoff value of random access. The UE that receives the Msg2 may perform random access backoff according to the BI in the BI subheader, and after the backoff value reaches a value indicated by the BI, random access may be initiated again, namely, sending the Msg1 again.

In one example, a MAC sub-PDU of the Msg2 carries the BI subheader of the BI. Referring to FIG. 4, in the MAC PDU that forms the Msg2, the first MAC sub-PDU is the MAC sub-PDU carrying the BI. A subheader of the first MAC sub-PDU in FIG. 4 may be called the BI subheader.

An E field in the subheader of each MAC sub-PDU in FIG. 4 may be used for indicating whether there are other fields in the subheader where it is located, and a T field may be used for indicating whether the subheader where it is located contains the RAP ID. For example, in the subheader of the first MAC sub-PDU, the T field indicates that the subheader where it is located does not an RAP ID but a BI subheader, and the BI subheader carries the BI. A subheader carrying the RAP ID in FIG. 4 may be called an RAP ID subheader.

In the example of the disclosure, the feedback information may be carried in the remaining bit in the BI subheader. For example, one or more of the reserved bits in the BI subheader may be used for indicating the feedback information, such as indicating the ACK or NACK in the feedback information.

In some examples, the BI subheader further carries the above auxiliary information. Here, the auxiliary information is at least used for the user equipment (UE) to determine the relevant information required for acquiring the SIB.

For example, the reserved bit of the BI subheader may further carry the above duration information and/or the availability state information.

Figure 6:
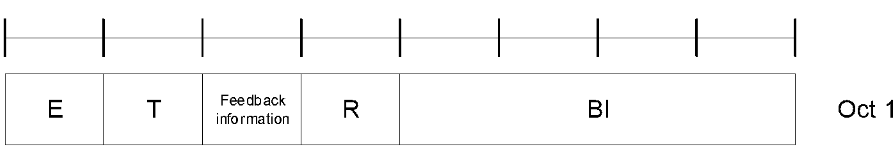
FIG. 6 is a schematic format diagram of a BI subheader illustrated according to an example.

FIG. 6 shows an information format example of a subheader containing the BI. A BI subheader shown in FIG. 6 may include an octet (oct1). An octet may include 8 bits. Referring to FIG. 6, it may be seen that in addition to carrying the BI, the BI subheader further carries the feedback information. An R field in FIG. 6 is a reserved field; an E field is an extended field, which indicates whether the subheader has other contents; and a T field is a type field, which indicates whether the subheader carries the RAP ID. The E field and the T field both may occupy 1 bit. The feedback information may also occupy a field in the subheader.

In this way, when the UE receives the Msg2, it can not only know whether a network layer may send the SIB requested by itself, but also know when to initiate the acquisition request for requesting the SIB again, according to the auxiliary information carried in the BI subheader, or a reason why the network side refuses to send the SIB. The reason includes, but is not limited to, the network side not being configured with configuration information carried in the SIB requested by the acquisition request, and/or being configured with the configuration information carried in the SIB, but a transmission resource indicated by the configuration information being unavailable.

In one example, the feedback information is carried in the reserved bit in the BI subheader.

In another example, the feedback information may have a corresponding relationship with the BI carried in the BI subheader. In this case, the BI carried in the BI subheader not only indicates the backoff value, but also indicates the NACK or ACK for the acquisition request.

In one example, S110 may include: receiving a third message (Msg3) carrying the acquisition request of the SIB.

In one example, the acquisition request of the SIB may be carried in the Msg3.

Correspondingly, S120 may include: the feedback information is carried in a Msg4 to be issued to the UE.

In one example, the Msg4 includes a medium access control control element (MAC CE).

A Msg4 may carry one or more MAC CEs. The MAC CE includes a MAC CE subheader. A MAC CE subheader may carry an LCID value.

Figure 7:
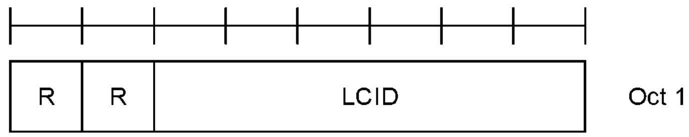
FIG. 7 is a schematic format diagram of a MAC CE illustrated according to an example.

In one example, the MAC CE subheader includes an oct, an oct has 8 bits, and the 8 bits include: a reserved field and an LCID field, the reserved field includes a reserved bit, and the LCID field is used for carrying the LCID value. As shown in FIG. 7, the reserved field may include 2 reserved bits, and the LCID field may include 6 bits. In this way, the LCID field has 64 LCID values. The 64 LCID values may be seen in Table 1, below.

TABLE 1

| Codepoint/Index | Contents indicated by LCID value |
|---|---|
| 0 | Common control channel (CCCH) |
| 1-32 | Identity of the logical channel |
| 33 | Extended logical channel ID field (two-octet eLCID field) |
| 34 | Extended logical channel ID field (one-octet eLCID field) |
| 35 | Enhanced UE contention resolution identity |
| 36-46 | Reserved |
| 47 | Recommended bit rate |
| 48 | Semi-persistent (SP) zero power (ZP) CSI-RS resource set activation/deactivation |
| 49 | Physical uplink control channel (PUCCH) spatial relation activation/deactivation |
| 50 | SP reference signal (RS) activation/deactivation |
| 51 | SP CSI reporting on PUCCH activation/deactivation |
| 52 | Transport configuration indicator (TCI) state indication for UE-specific PDCCH |
| 53 | TCI states activation/deactivation for UE-specific PDCCH |
| 54 | Aperiodic CSI trigger state sub-selection |
| 55 | SP CSI-RS/CSI-IM resource set activation/deactivation |
| 56 | Duplication activation/deactivation |
| 57 | SCell activation/deactivation (four octets) |
| 58 | SCell activation/deactivation (one octet) |
| 59 | Long discontinuous Reception (DRX) command |
| 60 | DRX command |
| 61 | Timing advance command |
| 62 | UE contention resolution identity |
| 63 | Padding |

The codepoint/index in Table 1 is 35, that is, the codepoint or index is 35, which is an example of the LCID value that has a corresponding relationship with the feedback information.

For example, the LCID value of the codepoint or index being 35 in Table 1 has a corresponding relationship with the NACK in the feedback information.

However, the network side is configured with a plurality of LCID values that may be carried in the MAC CE subheader in advance. One or more of the plurality of LCID values configured by the network side have the corresponding relationship with the feedback information. For example, one or more of the plurality of LCID values have the corresponding relationship with the NACK or ACK in the feedback information.

In summary, at least part of the plurality of LCID values carried in the MAC CE subheader have the corresponding relationship with the feedback information.

In one example, a MAC CE subheader carries an LCID value at a time. There are a plurality of alternative values that can be carried to the LCID values in the MAC CE subheader, and one or more of the plurality of alternative values have the corresponding relationship with the feedback information.

In this case, the LCID value carried in the Msg4 may or may not have the corresponding relationship with the feedback information. If the LCID value carried in the Msg4 has the corresponding relationship with the feedback information, after the UE receives the Msg4, the LCID value extracted from the Msg4 is the LCID value that has the corresponding relationship with the feedback information, then feedback of the network side for the acquisition request sent by the UE itself may be determined according to the LCID value, and the feedback information may be the NACK or ACK.

In one example, a MAC CE includes a payload.

A first part successively distributed in the payload does not have a corresponding relationship with the feedback information, and a second part, other than the first part, in the payload has a corresponding relationship with the feedback information.

For example, assuming that the payload is 48 bits, the 48 bits may be divided into a first part and a second part; the first part is used for resolving a contention collision between the UEs, and the second part is used for carrying the feedback information. It may be understood that the first part may include 32 bits, and the second part may include 16 bits for carrying the feedback information. In one example, the first part may be the first 32 bits out of the 48 bits, and the second part is the last 16 bits out of the 48 bits.

For another example, assuming that the payload is 48 bits. The first part in the 48 bits may include 40 bits, and the second part may be the remaining 8 bits.

The bits corresponding to the first part are successively distributed, which facilitates the UE to quickly determine whether its random access is successful after receiving the Msg4 subsequently.

In some examples, the payload of the MAC CE of the Msg4 has an extended bit, and the extended bit is used for carrying the feedback information. For example, assuming that the payload of the MAC CE is originally 48 bits, then the payload of the MAC CE that adds the extended bit may exceed 48 bits.

In the example of the disclosure, the payload of the MAC CE of the Msg4 has one or more extended bits, and the extended bits carry the above feedback information and/or the auxiliary information.

In the example of the disclosure, the original bits in the payload of the MAC CE may be used for resolving the contention collision between the UEs, the extended bit indicates the feedback information, and in this way, the number of bits of the payload of the MAC CE is increased. The feedback information indicated by the extended bit includes not only the ACK/NACK, but also any of the above auxiliary information.

In some examples, the MAC CE may include: two types of MAC CE, respectively being a first type of MAC CE and a second type of MAC CE. The first type of MAC CE and the second type of MAC CE have different purposes.

For example, the first type of MAC CE is used for resolving the contention collision between the UEs, and the second type of MAC CE is used for carrying the feedback information.

Both the first type of MAC CE and the second type of MAC CE include the MAC CE subheader. In some cases, both the first type of MAC CE and the second type of MAC CE not only include the MAC CE subheader, but also include a padding part.

The MAC CE subheader may be divided into a reserved field and an LCID field. In one example, if in the second type of MAC CE, the feedback information merely occupies the bits of the LCID field, it may be considered that the second type of MAC CE subheader carries the LCID value that has the corresponding relationship with the feedback information, and the LCID value may be a newly added LCID value or an enhanced LCID value. The newly added LCID value (or the enhanced LCID value) may be the LCID value of the codepoint or index being 35 in Table 1.

If the feedback information carried in the second type of MAC CE occupies the bits of the reserved field or is carried in the padding part of the second type of MAC CE, at this time, it may be considered that the bit value corresponding to the feedback information does not belong to the LCID value. In some cases, if part of the bit values of the reserved field are divided into the LCID field to obtain an enhanced LCID field, at this time, it may also be considered that the second type of MAC CE carries the enhanced LCID value that has the corresponding relationship with the feedback information.

A length of the MAC CE subheader may be fixed or not. For example, a fixed length of a MAC CE subheader may be 8 bits, and the number of bits contained in the MAC CE subheader may be an integer multiple of 8 bits.

In order to facilitate the convenient decoding of the Msg4 by simultaneously acquiring the first type of MAC CE and the second type of MAC CE, the first type of MAC CE and the second type of MAC CE are adjacently distributed in the Msg4.

FIG. 7 is a schematic diagram of a MAC CE subheader. A MAC CE subheader in FIG. 7 may include an octet (oct1). A MAC CE subheader includes an R field and an LCID field, and the R field is a reserved field with one or more reserved bits. The reserved field of the MAC CE subheader in FIG. 7 has 2 reserved bits. The LCID field of the MAC CE subheader in FIG. 7 has 6 bits, having 64 bit values, that is, it may indicate 64 LCID values.

FIG. 7 may be understood as an example of the first type of MAC CE subheader.

Figure 8A:
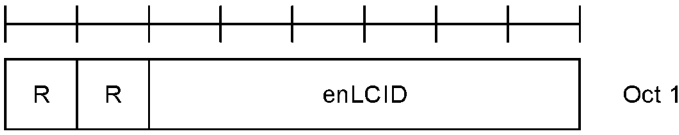
FIG. 8A is a schematic format diagram of a MAC CE illustrated according to an example.
Figure 8B:
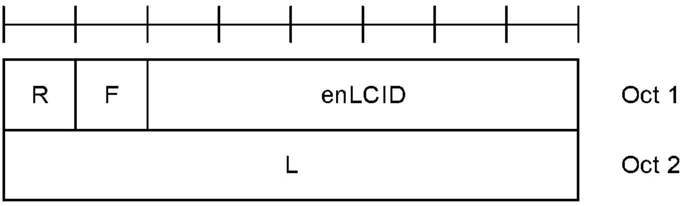
FIG. 8B is a schematic format diagram of a MAC CE illustrated according to an example.

FIG. 8A and FIG. 8B may be understood as an example of the second type of MAC CE.

The second type of MAC CE subheader shown in FIG. 8A has an enhanced logical channel identification (enLCID) field. The enLCID field may be used for carrying the feedback information or carrying an LCID value that has a corresponding relationship with the feedback information.

The length of the second type of MAC CE subheader, shown in FIG. 8A, is fixed, namely 1 octet, or 8 bits.

A length of the second type of MAC CE shown in FIG. 8B is unfixed; that is, the length of the second type of MAC CE is variable. The number of bits of the unfixed MAC CE is usually a positive integer multiple of 8.

In the second type of MAC CE shown in FIG. 8B, an F field is used for indicating that the length of the current MAC CE is unfixed. The length of the second type of MAC CE shown in FIG. 8B is increased from a fixed length of 1 octet to 2 octets, and the two octets are oct1 and oct2, respectively.

In FIG. 8B, the enLCID field and an L field may jointly indicate the feedback information. Alternatively, an L field is used for identifying that the enLCID field in the MAC CE subheader carries the feedback information or an LCID value that has a corresponding relationship with the feedback information.

In one example, the MAC CEs containing different types of MAC CE subheaders are different types of MAC CEs. Here, different types of MAC CEs at least include a first type of MAC CE and a second type of MAC CE.

In one example, the second type of MAC CE closely follows its corresponding first type of MAC CE. Through a position relationship between the first type of MAC CE and the second type of MAC CE, it indicates that the feedback information carried in the current second type of MAC CE is for the UE corresponding to the first type of MAC CE located in front of it.

In one example, S120 may include: a radio resource control (RRC) message carrying the feedback information is issued.

For example, the UE in a non-connected state sends the acquisition request through the Msg1 or the Msg3 or in other ways, and the UE can receive the RRC message after switching from the non-connected state to a connected state in a random access process. At this time, the base station of the network side may send the feedback information to the UE through the RRC message, and if the network side is not prepared to issue the SIB requested by the acquisition request, the UE may determine whether to continue to send the acquisition request according to the feedback information carried in the RRC message.

Figure 9:
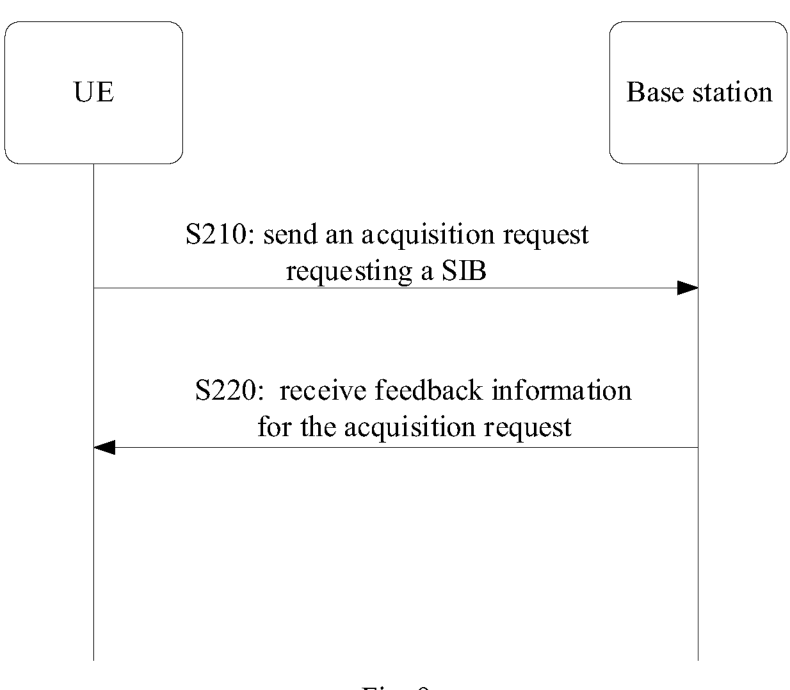
FIG. 9 is a schematic flowchart of a method for requesting a system information block illustrated according to an example.

As shown in FIG. 9, an example of the disclosure provides a method for requesting a system information block, including S210 and S220.

In S210, an acquisition request for requesting the SIB is sent.

In S220, feedback information for the acquisition request is received.

The method for requesting the system information block provided by the example of the disclosure may be applied to various pieces of UE for requesting the SIB. The UE may be in a non-connected state.

In one example, the UE may send the acquisition request via a Msg1 and/or Msg3 during a random access process.

In the example of the disclosure, the UE may receive the feedback information returned based on the acquisition request after sending the acquisition request. The feedback information may be explicitly carried through one or more bits, or implicitly carried via a corresponding relationship with other information.

In the example of the disclosure, the feedback information may include NACK or ACK. In this way, the UE may determine whether to continue to send the acquisition request according to the feedback information, or receive the requested SIB at a configuration resource of the requested SIB. By receiving the feedback information, unnecessary sending of the acquisition request and unnecessary waiting for receiving the SIB may be reduced.

In some examples, the SIB is an SIBx acquired in an on-demand form, and x is a positive integer equal to or greater than 2. In the example of the disclosure, the SIB requested by the acquisition request to a network side is the SIBx. In one example, the SIBx is an SIB carrying configuration information of a TRS, and/or an SIB carrying configuration information of a CSI-RS.

In some examples, S210 may include receiving the NACK, where the NACK indicates that the network side does not issue the requested SIB; or the ACK is received, where the ACK indicates that the network side issues the requested SIB.

The feedback information may be the NACK or the ACK, if the UE receives the NACK, it indicates that the network side may not send the requested SIB, on the one hand, the UE knows that the network side may not issue the requested SIB, so there is no need to repeat the request; and on the other hand, the UE does not need to wait for issuing the SIB by the network side, which reduces power consumption caused by the UE repeatedly requesting the SIB or waiting for monitoring the SIB.

If the UE receives the ACK, it indicates that the network side may issue the SIB requested by the UE, the UE may directly receive the requested SIB at the configuration resource of the requested SIB without repeating the request, reducing the power consumption generated by repeating the request.

In one example, the feedback information further includes auxiliary information, at least used for the user equipment (UE) to determine relevant information required for acquiring the SIB.

In one example, the auxiliary information may be issued when the feedback information is the NACK. For example, the auxiliary information may be used for indicating duration information of an interval duration required for the UE to send the acquisition request again, or information for indicating a reason for issuing the NACK by the network side, and the information for indicating the reason for issuing the NACK by the network side includes, but is not limited to, availability state information.

In one example, the auxiliary information includes the duration information, indicating an interval duration for the UE to initiate the acquisition request again; and/or availability state information, indicating whether the configuration information carried in the SIB requested by the acquisition request exists, or indicating whether the resource indicated by the configuration information carried in the SIB requested by the acquisition request is available.

In some other examples, when the feedback information is the ACK, the auxiliary information may be configuration information of the requested SIB, and the configuration information may at least indicate a transmission resource of the requested SIB. In this way, the UE may receive the SIB at the corresponding transmission resource according to the configuration information of the SIB carried in the auxiliary information.

In one example, S210 may include sending a first message (Msg1) carrying the acquisition request. The first message (Msg1) is one of random access messages, is the first random access message in the 4-step random access process, and generally carries an access preamble identifier (ID). In the example of the disclosure, the Msg1 not only carries the preamble ID, but also carries the acquisition request.

In some examples, S220 may include sending a second message (Msg2) carrying the feedback information.

In the example of the disclosure, the Msg2 carries the feedback information of the acquisition request. The feedback information may be NACK or ACK.

In one example, the Msg2 carries a feedback bit. The Msg2 carries the feedback bit for explicitly indicating the feedback information, and the feedback bit may be an original reserved bit in the Msg2, or an extended bit in the Msg2.

The feedback information is carried in a MAC random access response (RAR) of the Msg2. For example, as for a situation where the feedback information is explicitly indicated by the feedback bit, the feedback bit may be carried in the MAC RAR.

The MAC RAR carrying the feedback information is a second type of MAC RAR, and the MAC RAR not carrying the feedback information is a first type of MAC RAR. For example, the MAC RAR carried in the Msg2 carrying the feedback information is the second type of MAC RAR.

In one example, it is distinguished according to whether the Msg2 may carry the feedback information; it may be divided into a first type of Msg2 and a second type of Msg2.

For example, the Msg2 that cannot carry the feedback information is the first type of Msg2, and the Msg2 that can carry the feedback information is the second type of Msg2. It may be understood that the first type of Msg2 does not carry the feedback bit, and the second type of Msg2 carries the feedback bit; or the first type of Msg2 carries the first type of MAC RAR, and the second type of Msg2 carries the second type of MAC RAR.

The first type of Msg2 may be used as reply information of the Msg1, not carrying the acquisition request. The second type of Msg2 may be used as reply information of the Msg1 carrying the acquisition request.

In some examples, a communication resource of the Msg1 corresponding to the first type of Msg2 is different from a communication resource of the Msg1 corresponding to the second type of Msg2.

Since the communication resources of the Msg1 corresponding to different types of Msg2 are different, at this time, in S210, the UE may send the Msg1 at the corresponding communication resource according to whether the current to-be-sent Msg1 carries the acquisition request, so as to trigger the network side to issue the corresponding type of Msg2.

A configuration mode of the communication resource of the Msg1 corresponding to the second type of Msg2 may be different from a configuration mode of the communication resource of the Msg1 corresponding to the first type of Msg2. For example, the communication resource of the Msg1 corresponding to the second type of Msg2 may be configured via the non-critical extension in the SIB. The configuration of the non-critical extension is an optional configuration.

In one example, the method further includes receiving an SIB1, where the SIB1 carries resource information of the communication resource of the Msg1 corresponding to the second type of Msg2. Here, the resource information may be information indicating transmission of a time-frequency resource and/or a beam resource of the Msg1 corresponding to the second type of Msg2.

In one example, S220 may include receiving a Msg2 carrying a random access preamble (RAP) identifier (ID) corresponding to the feedback information.

In an implementation, the Msg2 does not directly carry the feedback bit of the feedback information, but implicitly indicates the feedback information by carrying the RAP ID that has a corresponding relationship with the feedback information.

For example, in the example of the disclosure, the RAP ID includes: an RAP ID that has a corresponding relationship with the NACK in the feedback information, an RAP ID that has a corresponding relationship with the ACK in the feedback information, and/or an RAP ID that does not have a corresponding relationship with the feedback information.

In some examples, the second type of Msg2 further has a type field, and the type field indicates the type of the Msg2. For example, the type field may include one or more bits, which indicate that the current Msg2 may be the second type of Msg2, so as to facilitate quick decoding of the Msg2 by the UE.

In one example, the RAP IDs corresponding to the feedback information of different SIBs are different; or the feedback information of the different SIBs corresponds to the same RAP ID.

In one example, according to the corresponding relationship between the RAP ID and the feedback information of the SIB and whether the Msg2 carrying the feedback information carries the auxiliary information, it may be divided into the following four cases.

Case 1: different RAP IDs carried in the Msg2 correspond to the feedback information of different SIBs, and the Msg2 does not have a MAC RAR carrying the auxiliary information.

Case 2: the same RAP ID carried in the Msg2 corresponds to the feedback information of the different SIBs, and the Msg2 does not have the MAC RAR carrying the auxiliary information.

Case 3: different RAP IDs carried in the Msg2 correspond to the feedback information of the different SIBs, and the Msg2 has the MAC RAR carrying the auxiliary information.

Case 4: the same RAP ID carried in the Msg2 corresponds to the feedback information of different SIBs, and the Msg2 has the MAC RAR carrying the auxiliary information.

In one example, the Msg2 further carries an information identifier of the SIB carrying the feedback information. The information identifier may be carried when an RAP ID corresponds to the feedback information of an SIB, or when an RAP ID corresponds to the feedback information of a plurality of SIBs, and for the consideration of reducing bit overhead, the information identifier may be carried merely when an RAP ID corresponds to the feedback information of the plurality of SIBs.

In one example, the information identifier may be indicated explicitly through a dedicated bit or implicitly indicated by establishing a corresponding relationship with other information.

In one example, when the information identifier is indicated explicitly through the dedicated bit, the information identifier is carried in an identification information field of the Msg2; the identification information field carries one or more information identifiers of the SIB corresponding to the NACK; or the identification information field carries one or more information identifiers of the SIB corresponding to the ACK.

In another example, the identification information field is contained in the MAC RAR of the Msg2, and the length of the MAC RAR is greater than or equal to the length of the identification information field.

In one example, if the Msg2 carries the auxiliary information, and the Msg2 is provided with the identification information field, the identification information field is further used for carrying the auxiliary information; and the auxiliary information is at least used for the user equipment (UE) to determine relevant information required for acquiring the SIB.

The auxiliary information carried in the Msg2 may be carried within or outside the identification information field.

In one example, the Msg2 has a MAC sub-PDU; and a Msg2 at least has a MAC sub-PDU that carries a BI subheader, and the BI subheader carries a BI. A reserved bit in the BI subheader may be used for carrying the feedback information.

In one example, the Msg2 has the BI subheader of the backoff indicator (BI); and the BI subheader carries the feedback information.

In one example, the feedback information is carried in the reserved bit of the BI subheader. In some examples, the BI subheader further carries auxiliary information; and the auxiliary information is at least used for the user equipment (UE) to determine relevant information required for acquiring the SIB.

In some examples, S210 may include sending a third message (Msg3) carrying the acquisition request of the SIB.

In some examples, S220 may include receiving a fourth message (Msg4) carrying the feedback information.

In one example, the Msg4 may include one or more medium access control control elements (MAC CEs).

The MAC CE carrying the feedback information may be called a feedback CE, which may be distinguished from the MAC CE for resolving the contention collision between the UEs. A MAC CE at least includes a MAC CE subheader. In some cases, the MAC CE contains not only the MAC CE subheader, but also a payload, and the feedback information carried in the feedback CE may be carried in the MAC CE subheader or the payload. In one example, the MAC CE includes the MAC CE subheader, and at least part of a plurality of LCID values carried in the MAC CE subheader have a corresponding relationship with the feedback information.

In one example, the Msg4 includes a medium access control control element (MAC CE). The MAC CE includes a payload. A first part successively distributed in the payload does not have a corresponding relationship with the feedback information. A second part, other than the first part, in the payload has a corresponding relationship with the feedback information.

In one example, the payload of the MAC CE of the Msg4 has an extended bit; and the extended bit is used for carrying the feedback information. In some examples, the payload of the MAC CE has an extended bit; and the extended bit carries the feedback information. For example, the feedback information may be explicitly indicated by the extended bit of the payload of the MAC CE, or may be implicitly indicated through an LCID value that has a corresponding relationship with the feedback information.

For example, the payload of a MAC CE has 48 bits, and the 48 bits may be used for resolving the contention collision between the UEs. For example, the 48 bits are used for carrying first 48 bits of an uplink (UL) common control channel service data unit (CCCH SDU) carried in the responded UE in the Msg3. The first 48 bits of the UL CCCH SDU carried in the Msg3 sent by different pieces of UE are different, so bit values of the first 48 bits of the UL CCCH SDU of the UE of which random access is successful are copied through the first 48 bits of the MAC CE. After receiving by each of UE, the first 48 bits of the MAC CE are compared with the first 48 bits of the UL CCCH SDU carried in the Msg3 sent by itself. If comparison is consistent, it is considered that its random access is successful; otherwise, it may be considered that its random access fails.

In the example of the disclosure, the MAC CE not only contains a first type of bit for resolving the contention collision between the UEs, but also contains a second type of bit in addition to the first type of bit. Here, the second type of bit may be used for carrying the feedback information or carrying an LCID value that has a corresponding relationship with the feedback information. If the number of the first type of bit is 48, the MAC CE containing the second type of bit inevitably exceeds 48 bits.

In one example, the Msg4 contains: a first type of MAC CE, used for resolving the contention collision between the UEs; and a second type of MAC CE, carrying the feedback information.

Both the first type of MAC CE and the second type of MAC CE include the MAC CE subheader. In some cases, both the first type of MAC CE and the second type of MAC CE not only include the MAC CE subheader, but also include the padding part.

A MAC CE subheader may be divided into a reserved field and an LCID field. In one example, if in the second type of MAC CE, the feedback information merely occupies the bits of the LCID field, it may be considered that the second type of MAC CE subheader carries the LCID value that has the corresponding relationship with the feedback information, and the LCID value may be a newly added LCID value or an enhanced LCID value. The newly added LCID value (or the enhanced LCID value) may be the LCID value of the codepoint or index being 35 in Table 1.

If the feedback information carried in the second type of MAC CE occupies the bits of the reserved field or is carried in the padding part of the second type of MAC CE, at this time, it may be considered that the bit value corresponding to the feedback information does not belong to the LCID value. In some cases, if part of the bit values of the reserved field are divided into the LCID field to obtain an enhanced LCID field, at this time, it may also be considered that the second type of MAC CE carries the enhanced LCID value that has the corresponding relationship with the feedback information.

In one example, the first type of MAC CE and the second type of MAC CE are adjacently distributed in the Msg4.

In another example, the first type of MAC CE and the second type of MAC CE are distributed at different positions in the Msg4. In one example, S220 may include receiving a radio resource control (RRC) message carrying the feedback information.

In one example, the UE may further receive the feedback information in the RRC message. The RRC message carrying the feedback information may be a dedicated RRC message specifically designed to carry the feedback information. For example, the dedicated RRC message may be RRC System Info Response.

In some examples, the RRC message carrying the feedback information may be an RRC message that multiplexes other contents carried in the related art. For example, if the current UE is in a non-connected state, the base station may carry the feedback information through an RRC connection setup message in the RRC message. When the UE detects the RRC connection setup message carrying the feedback information, it may set up an RRC connection with the base station, or the RRC connection may not be set up, but for acquiring the feedback information corresponding to the acquisition request sent by itself.

Figure 10:
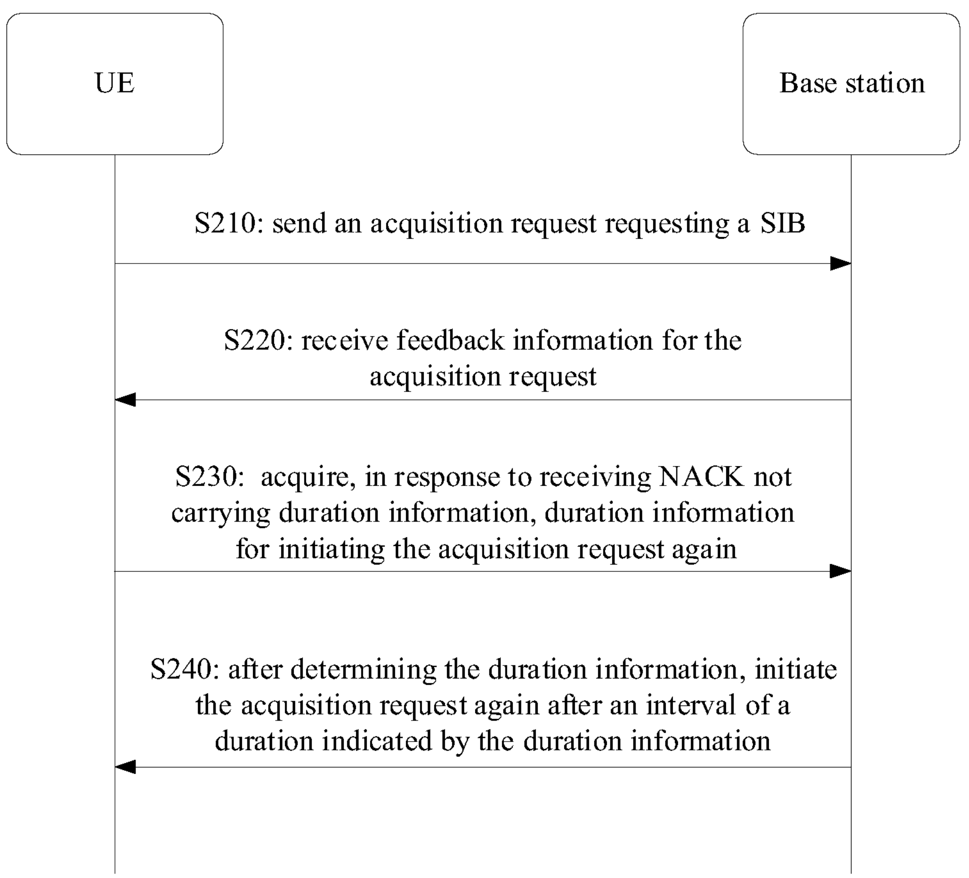
FIG. 10 is a schematic flowchart of a method for requesting a system information block illustrated according to an example.

In some examples, as shown in FIG. 10, the method includes steps S210 and S220, and further includes S230 and S240.

In S230, in response to receiving the NACK not carrying duration information, duration information for initiating the acquisition request again is acquired, where the duration information indicates an interval duration for the UE to initiate the acquisition request again. If the feedback information received by the UE is the NACK, at this time, it represents that the network side may not issue the requested SIB currently. With changes in network load and/or wireless environment, after a period of time, the base station may be able to issue the SIB or configure the configuration information carried in the SIB requested by the UE. In view of this, the UE may repeatedly send the acquisition request, but an interval of how long for sending the acquisition request again is needed. If sending the acquisition request is too frequent, on the one hand, further deterioration of the wireless environment may occur, and on the other hand, the power consumption of the UE may increase. If the sending of the acquisition request is too sparse, the latency of the UE requesting the corresponding SIB may be increased.

In S240, after determining the duration information, the acquisition request may be initiated again after an interval of a duration indicated by the duration information.

In some examples, the method further includes: in response to receiving the NACK carrying the duration information, the acquisition request is initiated again after an interval of a duration indicated by the duration information.

In one example, acquiring duration information for initiating the acquisition request again includes at least one of: sending request information for acquiring the duration information; determining the duration information according to a network configuration; determining the duration information according to a predetermined agreement; and determining the duration information according to a coping strategy of the UE for the NACK.

In one example, the UE may send a request information for acquiring the duration information to the network side. After receiving the request information, the network side may send the duration information to the UE by broadcasting, multicasting, or unicasting the message.

In another example, the network side may be configured with the duration information in advance.

In another example, in a process that the UE accesses the network multiple times, the duration information may be predetermined, and once the duration information is predetermined, subsequently, the UE may use the predetermined duration information one or more times to determine that the UE initiates the acquisition request for requesting the same SIB again.

In some other examples, the UE stores a coping strategy of the received NACK, and the duration information is determined according to the coping strategy.

For example, coping strategies of different types of UE for the received NACK are different, and an interval duration indicated by the duration information determined by a low-power-consumption Internet device according to the coping strategy may be greater than an interval duration indicated by the duration information determined by a non-power-consumption UE, such as a mobile phone or a vehicle-mounted terminal, according to the coping strategy.

For another example, the interval durations indicated by the duration information mapped by the coping strategies of the NACK of different SIBs are different. When the UE receives the NACK of the acquisition request for requesting an SIBy1, an interval duration indicated by the duration information determined according to the coping strategy is a first duration. When the UE receives the NACK of the acquisition request for requesting an SIBy2, an interval duration indicated by the duration information determined according to the coping strategy may be a second duration. The first duration is different from the second duration. Where y1 and y2 are both positive integers greater than 2, and are different positive integers greater than 2.

The specific size of the first duration and the second duration may be determined according to the urgency degree or priority of the SIBy1 and the SIBy2. For example, the urgency degree of the SIB carrying earthquake or tsunami notifications may be higher than that of the SIB carrying the configuration information of the CSI-RS, so the interval duration corresponding to the SIB carrying the earthquake or tsunami notifications may be smaller than the interval duration of the SIB carrying the configuration information of the CSI-RS.

The above descriptions are examples, and there are a plurality of specific implementations, which are not limited to any of the above.

Figure 11:
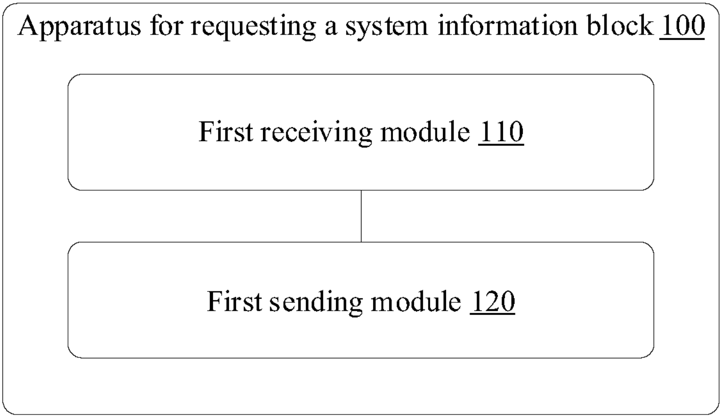
FIG. 11 is a schematic structural diagram of an apparatus for requesting a system information block illustrated according to an example.

As shown in FIG. 11, an example of the disclosure provides an apparatus for requesting a system information block 100, including a first receiving module 110 and a first sending module 120.

The first receiving module 110 is configured to receive an acquisition request for requesting the system information block (SIB).

The first sending module 120 is configured to issue feedback information for the acquisition request.

In one example, the first receiving module 110 and the first sending module 120 may both be program modules, and the program modules can realize receiving of the acquisition request of the SIB and issuing of the feedback information after being executed by a processor.

In another example, the first receiving module 110 and the first sending module 120 may be software and hardware combination modules; the software and hardware combination modules include, but are not limited to, programmable arrays; and the programmable arrays include, but are not limited to, a field programmable array or a complex programmable array.

In yet another example, the first receiving module 110 and the first sending module 120 may be pure hardware modules that include, but are not limited to, an application-specific integrated circuit.

In one example, the SIB is an SIBx acquired in an on-demand form, and x is a positive integer equal to or greater than 2. In one example, the SIBx is: an SIB carrying configuration information of a tracking reference signal (TRS); and/or an SIB carrying configuration information of a channel state indicator (CSI)-reference signal (RS).

In one example, the first sending module 120 is configured to issue the NACK, where the NACK indicates that the network side does not issue the requested SIB; or issue the ACK, where the ACK indicates that the network side issues the requested SIB.

In one example, the first sending module 120 is configured to perform at least one of: issuing the NACK in response to that a resource indicated by the configuration information carried in the requested SIB is not configured; issuing the NACK in response to that the resource indicated by the configuration information carried in the requested SIB is configured, and the resource indicated by the configuration information is unavailable; or issuing the NACK in response to that scheduling information of the requested SIB is in remained minimum system information (RMSI).

In one example, the feedback information further includes: auxiliary information, at least used for the user equipment (UE) to determine relevant information required for acquiring the SIB.

That is, in this case, the feedback information not only includes a feedback indication, but also includes the auxiliary information. The feedback indication here is the above NACK or ACK. The auxiliary information is used to assist the UE in acquiring the requested SIB or stopping the sending of the acquisition request.

In one example, the auxiliary information includes at least one of: duration information, indicating an interval duration for the UE to initiate the acquisition request again; and availability state information, indicating whether the configuration information carried in the SIB requested by the acquisition request exists, or indicating whether the resource indicated by the configuration information carried in the SIB requested by the acquisition request is available.

In one example, the first receiving module 110 is configured to receive a first message (Msg1) carrying the acquisition request. In one example, the first sending module 120 is configured to issue a second message (Msg2) carrying the feedback information. In one example, the feedback information is carried in a MAC random access response (RAR) of the Msg2. In one example, the MAC RAR carrying the feedback information is a second type of MAC RAR, and the MAC RAR not carrying the feedback information is a first type of MAC RAR. In one example, the Msg2 that cannot carry the feedback information is the first type of Msg2; and the Msg2 that can carry the feedback information is the second type of Msg2.

In one example, a communication resource of the Msg1 corresponding to the first type of Msg2 is different from a communication resource of the Msg1 corresponding to the second type of Msg2.

In one example, the first sending module 120 is further configured to issue an SIB1, where the SIB1 carries resource information of the communication resource of the Msg1 corresponding to the second type of Msg2. In one example, the first sending module 120 is configured to issue a Msg2 carrying a random access preamble (RAP) identifier (ID) corresponding to the feedback information. In one example, the Msg2 carrying the RAP ID corresponding to the feedback information is the second type of Msg2, and the Msg2 not carrying the RAP ID corresponding to the feedback information is the first type of Msg2.

In one example, different RAP IDs carried in the Msg2 correspond to the feedback information of different SIBs, and the Msg2 does not have the MAC RAR carrying the auxiliary information; or different RAP IDs carried in the Msg2 correspond to the feedback information of the different SIBs, and the Msg2 has the MAC RAR carrying the auxiliary information; RAP IDs corresponding to the feedback information of the different SIBs are different; or the feedback information of the different SIBs corresponds to the same RAP ID, and the Msg2 carries information identification of the SIB indicated by the feedback information.

In one example, the information identifier is carried in an identification information field of the Msg2; the identification information field carries one or more information identifiers of the SIB corresponding to the NACK; or the identification information field carries one or more information identifiers of the SIB corresponding to the ACK.

In one example, the identification information field is contained in the MAC RAR of the Msg2, and a length of a MAC RAR is greater than or equal to a length of the identification information field.

In one example, the identification information field is further used for carrying the auxiliary information, and the auxiliary information is at least used for the user equipment (UE) to determine relevant information required for acquiring the UE.

In one example, the Msg2 has a BI subheader of a backoff indicator (BI), and the BI subheader carries the feedback information.

In one example, the feedback information is carried in a reserved bit of the BI subheader. In this example, it is equivalent to that part of bits in the BI subheader indicates the BI, and the other part of bits indicates the feedback information.

In one example, the BI subheader further carries the auxiliary information, and the auxiliary information is at least used for the user equipment (UE) to determine relevant information required for acquiring the SIB.

In one example, the first receiving module 110 is configured to receive a third message (Msg3) carrying the acquisition request of the SIB.

In one example, the first sending module 120 is configured to issue a fourth message (Msg4) carrying the feedback information.

In one example, the Msg4 includes: the MAC CE; the MAC CE includes: a MAC CE subheader; and at least part of a plurality of LCID values carried in the MAC CE subheader have a corresponding relationship with the feedback information.

In one example, the Msg4 includes: the MAC CE; the MAC CE includes a payload; a first part successively distributed in the payload does not have a corresponding relationship with the feedback information; and a second part, other than the first part, in the payload has a corresponding relationship with the feedback information.

In one example, the payload of the MAC CE of the Msg4 has an extended bit, and the extended bit is used for carrying the feedback information. In one example, the Msg4 contains: a first type of MAC CE, used for resolving the contention collision between the UEs; and a second type of MAC CE, carrying the feedback information. In one example, the first type of MAC CE and the second type of MAC CE are adjacently distributed in the Msg4. In another example, the first sending module 120 is configured to issue a radio resource control (RRC) message carrying the feedback information.

Figure 12:
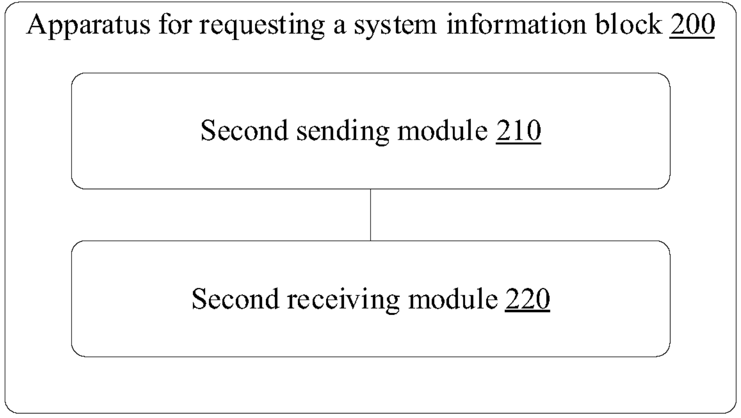
FIG. 12 is a schematic structural diagram of an apparatus for requesting a system information block illustrated according to an example.

As shown in FIG. 12, an example of the disclosure provides an apparatus for requesting a system information block 200, including a second sending module 210 and a second receiving module 220.

The second sending module 210 is configured to send an acquisition request for requesting the system information block (SIB).

The second receiving module 220 is configured to receive feedback information for the acquisition request.

In one example, the second sending module 210 and the second receiving module 220 may both be program modules, and the program modules can realize sending of the acquisition request of the SIB and receiving of the feedback information after being executed by a processor.

In another example, the second sending module 210 and second receiving module 220 may be software and hardware combination modules; the software and hardware combination modules include, but are not limited to, programmable arrays; and the programmable arrays include, but are not limited to, a field programmable array or a complex programmable array.

In yet another example, the second sending module 210 and the second receiving module 220 may be pure hardware modules that include, but are not limited to, an application-specific integrated circuit.

In one example, the SIB is an SIBx acquired in an on-demand form, and x is a positive integer equal to or greater than 2. In one example, the SIBx is: an SIB carrying configuration information of a tracking reference signal (TRS); and/or an SIB carrying configuration information of a channel state indicator (CSI)-reference signal (RS).

In one example, the second receiving module 220 is configured to receive a negative acknowledgement (NACK), where the NACK indicates that the network side does not issue the requested SIB; or receive an acknowledgement (ACK), where the ACK indicates that the network side issues the requested SIB.

In one example, the feedback information further includes: auxiliary information, at least used for the user equipment (UE) to determine relevant information required for acquiring the SIB. In one example, the auxiliary information includes at least one of: duration information, indicating an interval duration for the UE to initiate the acquisition request again; and availability state information, indicating whether the configuration information carried in the SIB requested by the acquisition request exists, or indicating whether the resource indicated by the configuration information carried in the SIB requested by the acquisition request is available.

In one example, the second sending module 210 is configured to send a first message (Msg1) carrying the acquisition request.

In one example, the second receiving module 220 is configured to receive a second message (Msg2) carrying the feedback information. In one example, the feedback information is carried in a MAC random access response (RAR) of the Msg2. In one example, the MAC RAR carrying the feedback information is a second type of MAC RAR, and the MAC RAR not carrying the feedback information is a first type of MAC RAR. In one example, the Msg2 that cannot carry the feedback information is the first type of Msg2; and the Msg2 that can carry the feedback information is the second type of Msg2.

In one example, a communication resource of the Msg1 corresponding to the first type of Msg2 is different from a communication resource of the Msg1 corresponding to the second type of Msg2.

In one example, the second receiving module 220 is further configured to receive an SIB1, where the SIB1 carries resource information of the communication resource of the Msg1 corresponding to the second type of Msg2. In one example, the second receiving module 220 is configured to receive a Msg2 carrying a random access preamble (RAP) identifier (ID) corresponding to the feedback information. In one example, the RAP IDs corresponding to the feedback information of different SIBs are different; or the feedback information of the different SIBs corresponds to the same RAP ID, and the Msg2 carries information identification of the SIB indicated by the feedback information.

In one example, the information identifier is carried in an identification information field of the Msg2; the identification information field carries one or more information identifiers of the SIB corresponding to the NACK; or the identification information field carries one or more information identifiers of the SIB corresponding to the ACK.

In one example, the identification information field is contained in the MAC RAR of the Msg2, and a length of a MAC RAR is greater than or equal to a length of the identification information field.

In one example, the identification information field is further used for carrying the auxiliary information, and the auxiliary information is at least used for the user equipment (UE) to determine relevant information required for acquiring the SIB.

In one example, the Msg2 has a BI subheader of a backoff indicator (BI), and the BI subheader carries the feedback information. In one example, the feedback information is carried in a reserved bit of the BI subheader. In one example, the BI subheader further carries the auxiliary information, and the auxiliary information is at least used for the user equipment (UE) to determine relevant information required for acquiring the SIB.

In one example, the second sending module 210 is configured to send a third message (Msg3) carrying the acquisition request of the SIB.

In one example, the second receiving module 220 is configured to receive a fourth message (Msg4) carrying the feedback information.

In one example, the Msg4 includes: the MAC CE; the MAC CE includes: a MAC CE subheader; and at least part of a plurality of LCID values carried in the MAC CE subheader have a corresponding relationship with the feedback information.

In one example, the Msg4 includes the MAC CE; the MAC CE includes a payload; a first part successively distributed in the payload does not have a corresponding relationship with the feedback information; and a second part, other than the first part, in the payload has a corresponding relationship with the feedback information.

In one example, the payload of the MAC CE of the Msg4 has an extended bit, and the extended bit is used for carrying the feedback information.

In one example, the Msg4 contains: a first type of MAC CE, used for resolving the contention collision between the UEs; and a second type of MAC CE, carrying the feedback information. In one example, the first type of MAC CE and the second type of MAC CE are adjacently distributed in the Msg4.

In one example, the second receiving module 220 is configured to receive a radio resource control (RRC) message carrying the feedback information.

In one example, the apparatus further includes: an acquiring module configured to acquire, in response to receiving the NACK not carrying duration information, duration information for initiating the acquisition request again, where the duration information indicates an interval duration for the UE to initiate the acquisition request again.

In one example, the acquiring module is configured to perform at least one of: sending request information for acquiring the duration information; determining the duration information according to a network configuration; determining the duration information according to a predetermined agreement; or determining the duration information according to a coping strategy of the UE for the NACK.

The methods for acquiring system information are broadcast acquisition and on-demand acquisition. For the former, the UE may directly read the system information in a system information window, while for the system information in the on-demand form, there is an indication bit in remained minimum system information (RMSI) indicating whether the system information is broadcasting/not broadcasting. For the system information being broadcasting, the user equipment (UE) may directly read the corresponding system information in a system information receiving window, while for the system information being not broadcasting, the UE needs to request through the Msg1 or the Msg3, after the UE obtains an acknowledgement (ACK) of the network, at this time, it may consider that the base station may broadcast the system information, and then the corresponding system information may be directly read in the system information receiving window.

Configuration information of a tracking reference signal (TRS)/channel reference signal (CRS) does not need to be broadcast continuously in a cell, for example, if there is no UE in an idle state in the network, or the UE in the idle state does not support the use of characteristics of the TRS/CRS in the idle state, then broadcasting the information may be considered as a waste of resources. So, the best method is to use UE to acquire the on-demand request. Here, the on-demand request is one of the above acquisition requests.

The on-demand request indicates that to-be-acquired system information scheduling information is broadcast in the RMSI in advance, and when the SI is acquired after the UE initiates the on-demand request, it is usually considered that the SI is usually is requested successfully. So, an on-demand request mechanism defaults to receiving the acknowledgement of the network. However, if the base station may not have the configuration of TRS/CRS for the UE in the idle state, at this time, it is highly possible that the UE may fail to request the configuration of TRS/CRS, and there may be the negative acknowledgement of the network side.

In view of this, a solution provided by the example of the disclosure may be as follows: for a request of the specific SI, the base station provides feedback information of the request, and the feedback information may at least include: the negative acknowledgement (NACK) indicating that the requested system information cannot be provided.

As an example, the specific system information (SI) is a SI-x acquired in the on-demand form. Here, x may be a positive integer equal to or greater than 2. The SI is the above SIB. As an example, the specific SI-x is configuration information carrying a specific reference signal, such as the TRS/CRS used by the UE in a non-connected state. Here, the UE in the non-connected state includes: UE in an idle state and/or UE in an inactive state.

The base station provides the negative acknowledgement (NACK) for an acquisition request of the specific SI, and at this time, the UE understands that the network side does not want to provide effective configuration. As an example, the UE requests, but the network does not have an available transmission resource of the TRS/CRS, so the NACK is replied. Here, the transmission resource of the TRS/CRS may be a time-frequency resource for sending the TRS/CRS. As an example, the UE requests one or more SIBs according to the acquisition request, the network has the TRS/CRS configuration, which is not available yet, so the network side replies the NACK.

If scheduling information of the specific SI has been sent in the RMSI, the UE initiates a request for the specific SI; and for the request of the specific SI, the base station provides the negative acknowledgement (NACK). The NACK reply of the on-demand request may further carry auxiliary information such as duration information. As an example, the NACK replay of the on-demand request may carry the duration information as T. At this time, the UE understands that the network does not want to provide an effective transmission duration of the TRS/CRS, and at this time, the UE may not need to request the SI again within a duration range indicated by the duration information.

For a request method of the Msg1, in the Msg2, it needs to modify an existing protocol to add an indication for the NACK.

Method 1: a MAC net load for random access response is enhanced, and is used for carrying information such as NACK and/or duration information returned by the base station.

Several ways that can be realized are provided below.

1) A MAC CE payload for random access response is enhanced. Here, the payload may also be called a net load. For example, the MAC payload for random access response type2 is introduced when enhancing the MAC net load for random access response. The original MAC payload for random access response is type1, where the MAC RAR type2 is used for carrying ACK or NACK and/or duration information returned by the base station, and further available information of the TRS/CRS.
2) When UE of a version 1 requests the system information, a MAC CE of RAP ID only may be received; and UE of a new version (namely version 2) may receive the MAC CE of the RAP ID and the MAC CE of MAC RAR type2. After receiving that, it is matched with the RAP ID sent by the UE itself, the UE may further determine the Msg2, and the feedback information of the network side for the acquisition request of the SI itself is determined. For example, the feedback information may be the ACK or NACK.
3) In order to realize backward compatibility and ensure that the UE of the version 1 decodes MAC payload for random access response type2 errors, resources requested by the UE of version 2 in the Msg1 are invisible to the UE of version 1. For example, an example is that configuration of a non-critical extension is performed in the SIB1. The configuration of non-extension may be a configuration for requests for system information (SI-RequestConfig), with examples as follows:

```
si-RequestConfigSUL-v17xy                        SI-RequestConfig
 OPTIONAL,   -- Cond SUL-MSG-1                   SI-RequestConfig
 si-RequestConfigSUL-v17xy
 OPTIONAL,   -- Cond SUL-MSG-1
```

The above is an example of separately configuring resources for Msg1 of type2 and Msg2 of type2, and there are a plurality of specific implementations, which are not limited to any of the above. Here, the Msg1 of type2 is the above Msg1 corresponding to the second type of Msg2. Here, the Msg2 of type2 is the above second type of Msg2.

Method 2: an RAP ID is reserved for NACK of the request of the specific SI. For example, the reserved RAP ID may be an RAP ID that establishes a corresponding relationship with the feedback information of the SI request.

Case 1: the network reserves the RAP ID for NACK of the request of the specific SI. When the UE receives the RAP ID reserved by the network, it implicitly represents the NACK reply of the network; and at this time, after receiving it, the UE may not continue to attempt until the maximum number of retransmissions of the Msg1 is reached. The UE may save more power by using this method.

Case 2: the network reserves the RAP ID for the ACK and/or NACK of the request of the specific SI. NACK is taken as an example below. When the UE receives the RAP ID reserved by the network, it implicitly represents the NACK reply of the network; the UE may further check MAC RAR type2, where the MAC RAR type2 is used for carrying the NACK and/or duration information returned by the base station and further available information of the TRS/CRS. At this time, the RAR corresponding to the RAP ID reserved by the network is the MAC RAR type2.

Case 3: the network reserves a NACK RAP ID for NACK of SI RAP ID-i requested by the specific SI-i (System Information-i). When the UE receives the NACK RAP ID reserved by the network and the SI RAP ID-i, the UE considers that the NACK reply for the SI RAP ID-i requested by the specific SI-i is received.

Here, the RAP IDs reserved by the network in cases 1 to 3 are all the above RAP IDs corresponding to the feedback information.

In one example, the length of an information field (such as MAC RAR type2) carrying the SI RAP ID-i is the same as the length of the MAC RAR. In this way, the SI RAP ID-i may be better directly contained in a MAC RAR.

It may be understood that the information field carrying the SI RAP ID-i may carry a plurality of SI RAP ID-i, which are used for replying to the NACK of the SI RAP ID-i requested by a plurality of specific SI-i. Here, the NACK is the NACK of the above acquisition request.

It may be understood that the information field carrying the SI RAP ID-i may further carry the duration information and availability state information indicating whether the TRS/CRS is available.

Method 3: a content of an existing BI subheader is enhanced, and is used as the NACK reply of the on-demand request, that is, a reserved bit that is reserved by the BI subheader is used for carrying more information other than a BI, for example, the reserved bit may be used for indicating whether the network does not have the available TRS/CRS resource or has the available TRS/CRS resource, which is currently not available yet. Here, the TRS/CRS resource is a communication resource for sending the TRS/CRS.

For the UE of version 1, if receiving the NACK reply from the network, it needs to continue to use the BI to initiate a next request until the maximum transmission number of Msg1s is reached, and a new user may obtain more information of the TRS/CRS.

For a method of a Msg3, in a Msg4, it needs to modify an existing protocol to add an indication for the ACK and/or NACK. NACK is taken as an example below.

Method A: the existing content of the MAC CE for collision resolution is enhanced, and is used as the NACK reply for the on-demand request.

An implementation is to add a new LCID value, and the newly added LCID value may be an enhanced UE contention resolution identity. The newly added LCID value may be carried in a new MAC CE.

The payload of the new MAC CE may be different from that of the MAC CE for resolving the collision between the UEs.

The payload of the MAC CE for resolving the collision between the UEs is to use the first 48 bits of UL CCCH SDU carried in the Msg3 as the identity of the contention collision.

Improvement is performed based on the MAC CE for resolving the collision between the UEs, fewer bits may be used in the new MAC CE, for example, first 32 bits are used as the identity of the contention collision, and other bits are used for carrying the NACK, and/or the duration information and/or whether the network does not have the available TRS/CRS resource or has the available TRS/CRS resource, which is currently not available yet are simultaneously indicated.

For a situation where the UE of the version 1 uses the original LCID value, the newly added LCID value will not be recognized. The UE of the new version will acquire a new LCID value.

A corresponding relationship between the LCID value after the LCID value is newly added and the codepoint/index, it may refer to the above Table 1, which will not be repeated here.

Method B: In the extended related art, the bits of the MAC CE for UE contention resolution identity (ID) are used for carrying the NACK.

For the UE of version 1, only the first 48 bits may be acquired for collision resolving; and for the UE of version 2, it needs to check the first 48 bits to complete collision resolution, and then acquire the subsequent feedback information, and the feedback information includes, but is not limited to, the NACK and/or ACK.

Method C: a new LCID value is added, the newly added LCID value is carried in the MAC CE, and the MAC CE carrying the LCID value may be called a feedback CE. The feedback CE may include: a NACK CE carrying the NACK and/or an ACK CE carrying the ACK.

If the UE further receives the NACK CE after resolving the collision between the UEs, it means that the acquisition request sent by the UE is replied to with the NACK. If the UE further receives the ACK CE after resolving the collision between the UEs, it means that the acquisition request is replied to by the ACK of the network side. A position of the feedback CE closely follows the UE contention resolution identity MAC CE, and is used for implicitly indicating the UE contention resolution identity MAC CE associated with the feedback CE. For example, a position of the NACK CE closely follows the UE contention resolution identity MAC CE, and is used for implicitly indicating the UE contention resolution identity MAC CE associated with the NACK CE.

A length of the NACK CE may be of two types, respectively being a fixed length and a variable length; and a subheader of the NACK CE with the fixed length may be shown as FIG. 8A, and a subheader of the NACK CE with the variable length may be shown as FIG. 8B.

Method D: an RRC message is enhanced, that is, a new RRC message (RRCSystemInfoResponse) is added and used for carrying the feedback information. The feedback information includes: the NACK and/or ACK. When the feedback information is the NACK, the RRC message may further include auxiliary information. The auxiliary information contains the ACK, NACK, and/or the duration information returned by the base station, and further available information of the TRS/CRS.

In one example, if the NACK reply of the on-demand request does not carry the duration information, when the UE requests again depend on a time interval configured by the network.

As an example, the time interval may be pre-determined based on the network configuration. In one example, if the NACK reply of the on-demand request does not carry the duration information, when to request again by the UE depends on UE implementation.

An example of the disclosure provides a communication device including: a memory configured to store processor-executable instructions; and a processor connected to the memory. The processor is configured to perform the method for requesting the system information block provided by any aforementioned technical solution. The processor may include storage media of various types. The storage media are non-transitory computer storage media, and can continue to memorize information stored after the communication device is powered down. Here, the communication device includes a base station or UE.

The processor may be connected with the memory via a bus and the like, and is configured to read executable programs stored in the memory, such as at least one of the methods shown in FIGS. 2, 3, 9, and/or 10.

Figure 13:
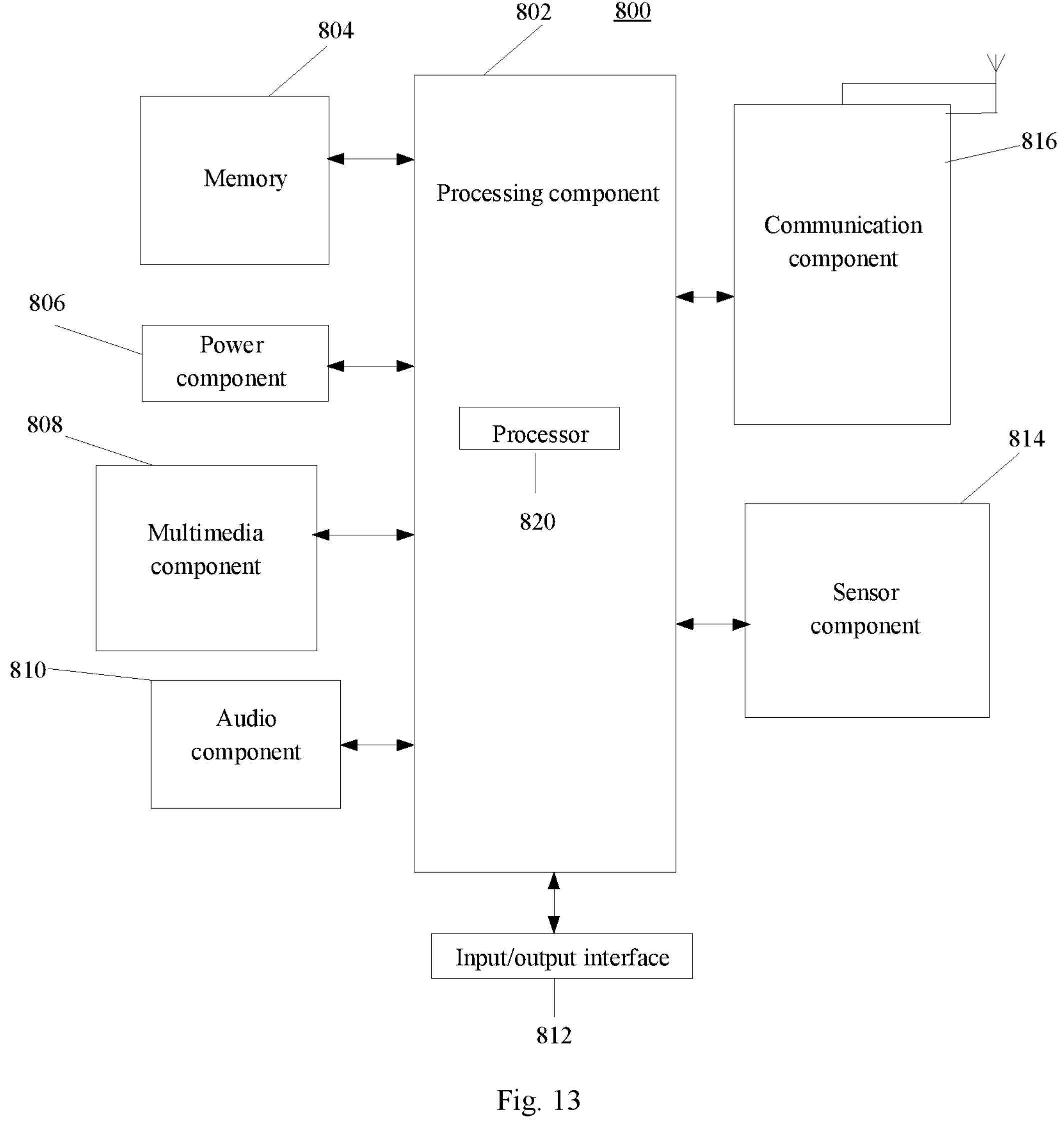
FIG. 13 is a schematic structural diagram of UE illustrated according to an example.

FIG. 13 is a block diagram of UE 800 illustrated according to an example. For example, the UE 800 may be a mobile phone, a computer, a digital broadcasting user device, a message receiving and transmitting device, a game console, a tablet device, a medical device, a fitness device, or a personal digital assistant.

Referring to FIG. 13, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls an overall operation of the UE 800, such as operations associated with display, telephone call, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the UE 800. Instances of these data include instructions for any application or method operating on the UE 800, contact data, phonebook data, messages, pictures, videos, etc. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc.

The power component 806 provides power for various components of the UE 800. The power component 806 may include a power management system, one or more power sources, and other components associated with generating, managing, and distributing power for the UE 800.

The multimedia component 808 includes a screen providing an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding, and gestures on the touch panel. The touch sensor may not only sense the boundary of the touch or sliding action, but also detect the duration and pressure related to the touch or sliding operation. In some examples, the multimedia component 808 includes a front camera and/or a rear camera. When the UE 800 is in an operation mode, such as a shooting mode or a video mode, the front camera and/or the rear camera can receive external multimedia data. The front camera and the rear camera each may be a fixed optical lens system or have a focal length and optical zoom capability.

The audio component 810 is configured to output and/or input an audio signal. For example, the audio component 810 includes a microphone (MIC) configured to receive an external audio signal when the UE 800 is in the operation mode, such as a call mode, a recording mode, and a speech recognition mode. The received audio signal may be further stored in the memory 804 or transmitted via the communication component 816. In some examples, the audio component 810 further includes a speaker for outputting the audio signal.

The I/O interface 812 provides an interface between the processing component 802 and a peripheral interface module, which may be a keyboard, a click wheel, a button, etc. These buttons may include, but are not limited to, a home button, a volume button, a start button and a lock button.

The sensor component 814 includes one or more sensors for evaluating the state of various aspects of the UE 800. For instance, the sensor component 814 can detect an on/off state of the UE 800 and the relative positioning of the components, for example, the component is a display and a keypad of the UE 800. The sensor component 814 can also detect the change in the position of the UE 800 or one component of the UE 800, the presence or absence of user contact with the UE 800, the azimuth or acceleration/deceleration of the UE 800, and the temperature change of the UE 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the UE 800 and other devices. The UE 800 may access a wireless network based on a communication standard, such as WiFi, 2G, 3G, or a combination thereof. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the UE 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the above method.

In an example, a non-transitory computer-readable storage medium including instructions is further provided, such as the memory 804 including instructions, which can be executed by the processor 820 of the UE 800 to complete the above method. For example, the non-transitory computer-readable storage medium may be a ROM, a random access memory (RAM), a CD-ROM, a magnetic tape, a floppy disk, an optical data storage device, etc.

Figure 14:
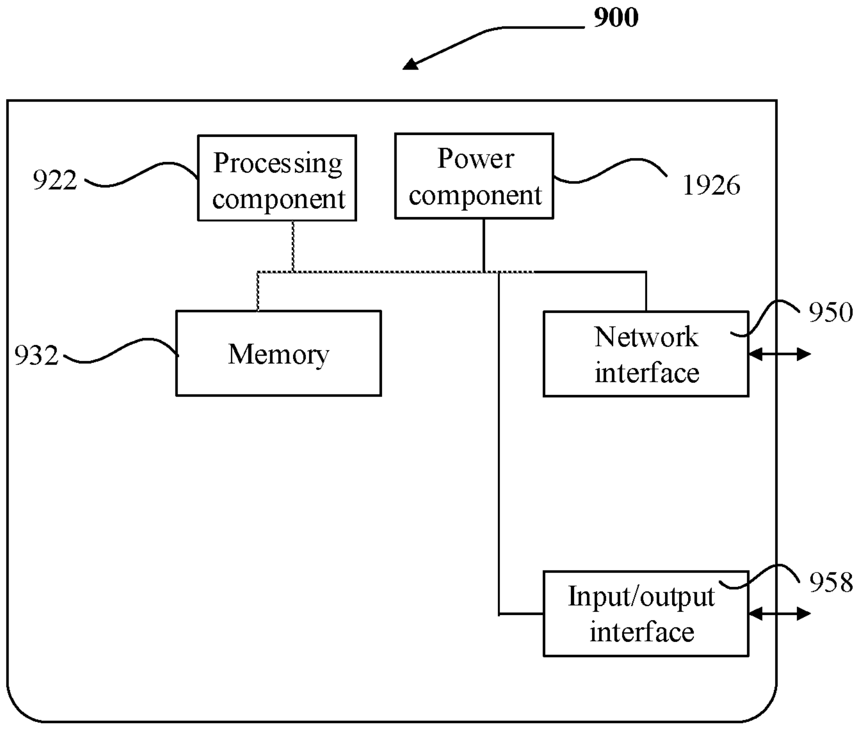
FIG. 14 is a schematic structural diagram of a base station illustrated according to an example.

As shown in FIG. 14, an example of the disclosure provides a structure of a base station. For example, the base station 900 may be provided as a network-side device. Referring to FIG. 14, the base station 900 includes a processing component 922, which further includes one or more processors, and a memory resource represented by a memory 932, which is configured to store instructions, such as applications, executable by the processing component 922. The applications stored in the memory 932 may include one or more modules, each corresponding to a set of instructions. In addition, the processing component 922 is configured to execute instructions to execute any of the methods applied to the base station, such as the methods shown in FIGS. 2, 3, 9, and/or 10.

The base station 900 may further include a power component 1926 configured to execute power management of the base station 900, a wired or wireless network interface 950 configured to connect the base station 900 to the network, and an input/output (I/O) interface 958. The base station 900 may operate an operating system stored in the memory 932, such as Windows Server™, Mac OS X™, Unix™, Linux™, FreeBSD™, or the like.

Other examples of the disclosure will be apparent to those skilled in the art from consideration of the specification and practice of the disclosure here. The disclosure is intended to cover any variations, uses, or adaptations of the disclosure following the general principles of the disclosure and including such departures from the disclosure as come within known or customary practice in the art. It is intended that the specification and examples be considered as examples.

It will be appreciated that the disclosure is not limited to the exact construction that has been described above and illustrated in the accompanying drawings, and that various modifications and changes may be made without departing from its scope. It is intended that the scope of the disclosure is limited to the appended claims.

What is claimed is:

1. A method for requesting a system information block (SIB), performed by a network device, comprising:

receiving an acquisition request for requesting the SIB; and issuing feedback information for the acquisition request, wherein receiving the acquisition request for requesting the SIB comprises:

receiving a first message (Msg1) carrying the acquisition request, wherein issuing the feedback information for the acquisition request comprises:

issuing a second message (Msg2) carrying the feedback information, wherein the Msg2 has a backoff indicator (BI) subheader of a BI, and the BI subheader carries the feedback information and auxiliary information, wherein the feedback information is carried by a reserved bit of the BI subheader, and wherein the auxiliary information is at least configured for a user equipment (UE) to determine relevant information required for acquiring the SIB.

2. The method according to claim 1, wherein issuing the feedback information for the acquisition request, further comprises at least one of:

issuing a negative acknowledgement (NACK), wherein the NACK indicates that a network side does not issue the requested SIB; or issuing an acknowledgement (ACK), wherein the ACK indicates that the network side issues the requested SIB, and wherein issuing the NACK comprises at least one of:

issuing the NACK in a case where a resource indicated by configuration information carried in the requested SIB is not configured;

issuing the NACK in a case where the resource indicated by the configuration information carried in the requested SIB is configured, and the resource indicated by the configuration information is unavailable; or issuing the NACK in a case where scheduling information of the requested SIB is in remaining minimum system information (RMSI).

3. The method according to claim 1, wherein the feedback information further comprises the auxiliary information, and wherein the auxiliary information comprises at least one of:

duration information, wherein the duration information indicates an interval duration for the UE to initiate the acquisition request again, availability state information, wherein the availability state information indicates whether configuration information carried in the SIB requested by the acquisition request exists, or availability state information, wherein the availability state information indicates whether a resource indicated by the configuration information carried in the SIB requested by the acquisition request is available.

4. The method according to claim 1, wherein the feedback information is carried in a media access control (MAC) random access response (RAR) of the Msg2, the MAC RAR carrying the feedback information is a second type of MAC RAR, and the MAC RAR not carrying the feedback information is a first type of MAC RAR, the Msg2 that cannot carry the feedback information is a first type of Msg2, and the Msg2 that can carry the feedback information is a second type of Msg2.

5. The method according to claim 4, wherein a communication resource of the Msg1 corresponding to the first type of Msg2 is different from a communication resource of the Msg1 corresponding to the second type of Msg2; and the method further comprises:

issuing a SIB1, wherein the SIB1 carries resource information of the communication resource of the Msg1 corresponding to the second type of Msg2.

6. The method according to claim 1, wherein issuing the feedback information for the acquisition request comprises:

issuing the Msg2 carrying a random access preamble (RAP) identifier (ID) corresponding to the feedback information, and wherein the Msg2 carrying the RAP ID corresponding to the feedback information is a second type of Msg2, and the Msg2 not carrying the RAP ID corresponding to the feedback information is a first type of Msg2.

7. The method according to claim 1, wherein receiving the acquisition request for requesting the SIB comprises:

receiving a third message (Msg3) carrying the acquisition request for the SIB, and issuing the feedback information for the acquisition request comprises:

issuing a fourth message (Msg4) carrying the feedback information.

8. The method according to claim 7, wherein the Msg4 comprises a medium access control control element (MAC CE), the MAC CE comprises a MAC CE subheader, and at least part of a plurality of logical channel identifier (LCID) values carried in the MAC CE subheader have a corresponding relationship with the feedback information.

9. The method according to claim 7, wherein the Msg4 comprises a medium access control control element (MAC CE), the MAC CE comprises a payload, a first part successively distributed in the payload does not have a corresponding relationship with the feedback information, and a second part, other than the first part, in the payload has a corresponding relationship with the feedback information.

10. The method according to claim 7, wherein the Msg4 comprises:

a first type of MAC CE, wherein the first type of MAC CE is configured for resolving a contention collision between UEs, and a second type of MAC CE, wherein the second type of MAC CE carries the feedback information, and the first type of MAC CE and the second type of MAC CE are adjacently distributed in the Msg4.

11. The method according to claim 1, wherein issuing the feedback information for the acquisition request comprises:

issuing a radio resource control (RRC) message carrying the feedback information.

12. A communication device, comprising:

a processor;

a transceiver; and a memory storing an executable program that is capable of being executed by the processor, and wherein the executable program, when executed by the processor, causes the processor to perform the method according to claim 1.

13. A method for requesting a system information block (SIB), performed by a user equipment (UE), comprising:

sending an acquisition request for requesting the SIB; and receiving feedback information for the acquisition request, wherein sending the acquisition request for requesting the SIB comprises:

sending a first message (Msg1) carrying the acquisition request, wherein receiving the feedback information for the acquisition request comprises:

receiving a second message (Msg2) carrying the feedback information, wherein the Msg2 has a backoff indicator (BI) subheader of a BI, and the BI subheader carries the feedback information and auxiliary information, wherein the feedback information is carried by a reserved bit of the BI subheader, and wherein the auxiliary information is at least configured for the UE to determine relevant information required for acquiring the SIB.

14. The method according to claim 13, wherein receiving the feedback information for the acquisition request, further comprises at least one of:

receiving a negative acknowledgement (NACK), wherein the NACK indicates that a network side does not issue the requested SIB, or receiving an acknowledgement (ACK), wherein the ACK indicates that the network side issues the requested SIB.

15. The method according to claim 14, further comprising:

acquiring, in response to receiving the NACK not carrying duration information, duration information for initiating the acquisition request again, wherein the duration information indicates an interval duration for the UE to initiate the acquisition request again.

16. The method according to claim 13, wherein the feedback information further comprises the auxiliary information, and, wherein the auxiliary information comprises at least one of:

duration information, wherein the duration information indicates an interval duration for the UE to initiate the acquisition request again, availability state information, wherein the availability state information indicates whether configuration information carried in the SIB requested by the acquisition request exists, or availability state information, wherein the availability state information indicates whether a resource indicated by the configuration information carried in the SIB requested by the acquisition request is available.

17. The method according to claim 13, wherein the feedback information is carried in a media access control (MAC) random access response (RAR) of the Msg2, the MAC RAR carrying the feedback information is a second type of MAC RAR, and the MAC RAR not carrying the feedback information is a first type of MAC RAR, the Msg2 that cannot carry the feedback information is a first type of Msg2, and the Msg2 that can carry the feedback information is a second type of Msg2, and a communication resource of the Msg1 corresponding to the first type of Msg2 is different from a communication resource of the Msg1 corresponding to the second type of Msg2.

18. The method according to claim 17, further comprising:

receiving a SIB1, wherein the SIB1 carries resource information of the communication resource of the Msg1 corresponding to the second type of Msg2.

19. The method according to claim 13, wherein receiving the feedback information for the acquisition request comprises:

receiving the Msg2 carrying a random access preamble (RAP) identifier (ID) corresponding to the feedback information.

20. The method according to claim 13, wherein sending the acquisition request for requesting the SIB comprises:

sending a third message (Msg3) carrying the acquisition request for the SIB, and receiving the feedback information for the acquisition request comprises:

receiving a fourth message (Msg4) carrying the feedback information.

21. The method according to claim 20, wherein the Msg4 comprises a medium access control control element (MAC CE), the MAC CE comprises a MAC CE subheader, and at least part of a plurality of logical channel identifier (LCID) values carried in the MAC CE subheader have a corresponding relationship with the feedback information.

22. The method according to claim 20, wherein the Msg4 comprises a medium access control control element (MAC CE), the MAC CE comprises a payload, a first part successively distributed in the payload does not have a corresponding relationship with the feedback information, and a second part, other than the first part, in the payload has a corresponding relationship with the feedback information.

23. The method according to claim 20, wherein the Msg4 comprises:

a first type of MAC CE, wherein the first type of MAC CE is configured for resolving a contention collision between UEs; and a second type of MAC CE, wherein the second type of MAC CE carries the feedback information, and wherein the first type of MAC CE and the second type of MAC CE are adjacently distributed in the Msg4.

24. The method according to claim 13, wherein receiving the feedback information for the acquisition request comprises:

receiving a radio resource control (RRC) message carrying the feedback information.

25. A communication device, comprising:

a processor;

a transceiver; and a memory storing an executable program that is capable of being executed by the processor, and wherein the executable program, when executed by the processor, causes the processor to perform the method according to claim 13.

* * * * *